(12) United States Patent
Hakkaku et al.

(10) Patent No.: US 11,214,009 B2
(45) Date of Patent: Jan. 4, 2022

(54) SHAPING SYSTEM, SHAPING METHOD, AND SHAPED OBJECT

(71) Applicant: MIMAKI ENGINEERING CO., LTD., Nagano (JP)

(72) Inventors: Kunio Hakkaku, Nagano (JP); Wataru Hioki, Nagano (JP); Keita Nishio, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 26 days.

(21) Appl. No.: 16/342,532

(22) PCT Filed: Oct. 19, 2017

(86) PCT No.: PCT/JP2017/037890
§ 371 (c)(1),
(2) Date: Apr. 17, 2019

(87) PCT Pub. No.: WO2018/079416
PCT Pub. Date: May 3, 2018

(65) Prior Publication Data
US 2019/0240914 A1    Aug. 8, 2019

(30) Foreign Application Priority Data
Oct. 24, 2016  (JP) .............................. JP2016-207717

(51) Int. Cl.
*B29C 64/393*  (2017.01)
*B33Y 50/02*   (2015.01)
(Continued)

(52) U.S. Cl.
CPC .......... *B29C 64/393* (2017.08); *B29C 64/106* (2017.08); *B29C 64/20* (2017.08);
(Continued)

(58) Field of Classification Search
CPC ..... B29C 64/106; B29C 64/112; B29C 64/20; B29C 64/209; B29C 64/286;
(Continued)

(56) References Cited

U.S. PATENT DOCUMENTS 7,609,451 B1 * 10/2009 Scarbrough ............ G02B 27/10
                                                    359/619
2014/0196618 A1 * 7/2014 Pervan ....................... B41J 2/32
                                                    101/32
(Continued)

FOREIGN PATENT DOCUMENTS

JP    2000218060    8/2000
JP    2011056697    3/2011
(Continued)

OTHER PUBLICATIONS

"International Search Report (Form PCT/ISA/210)" of PCT/JP2017/037890, dated Nov. 21, 2017, with English translation thereof, pp. 1-4.

*Primary Examiner* — Yuhui R Pan
(74) *Attorney, Agent, or Firm* — JCIPRNET

(57) ABSTRACT

A shaping system that shapes a stereoscopic shaped object, the shaping system including a control PC and a shaping device serving as a shaping executer, where the control PC includes a three-dimensional data inputter that accepts an input of three-dimensional data, which is data indicating at least a stereoscopic shape of the shaped object, and a surface data processor that generates decorated shaped object data, which is data indicating the shaped object on which decoration indicated by decoration data has been applied based on the decoration data which is data indicating decoration to be applied on at least a part of the surface of the shaped object and the three-dimensional data, and the shaping device executes a shaping operation of the shaped object
(Continued)

based on the decorated shaped object data to shape the shaped object on which decoration indicated by the decoration data has been applied.

16 Claims, 12 Drawing Sheets

(51) Int. Cl.
  *B33Y 30/00* (2015.01)
  *B33Y 10/00* (2015.01)
  *B33Y 80/00* (2015.01)
  *B29C 64/209* (2017.01)
  *B33Y 50/00* (2015.01)
  *B29C 64/20* (2017.01)
  *B29C 64/106* (2017.01)
  *B29C 64/286* (2017.01)
  *B29C 64/386* (2017.01)

(52) U.S. Cl.
  CPC ............ *B29C 64/209* (2017.08); *B33Y 10/00* (2014.12); *B33Y 30/00* (2014.12); *B33Y 50/00* (2014.12); *B33Y 50/02* (2014.12); *B33Y 80/00* (2014.12); *B29C 64/286* (2017.08); *B29C 64/386* (2017.08)

(58) Field of Classification Search
  CPC ..... B29C 64/386; B29C 64/393; B33Y 10/00; B33Y 30/00; B33Y 50/00; B33Y 50/02; B33Y 80/00
  See application file for complete search history.

(56) References Cited

U.S. PATENT DOCUMENTS

2015/0324490 A1* 11/2015 Page ................. G06Q 30/0621
            700/98
2016/0075090 A1*  3/2016 Kautz ................. B29C 64/393
            428/64.1

FOREIGN PATENT DOCUMENTS

| JP | 2015-71282 | 4/2015 |
| JP | 2016016568 | 2/2016 |
| JP | 2016043610 | 4/2016 |
| JP | 2016128254 | 7/2016 |

* cited by examiner

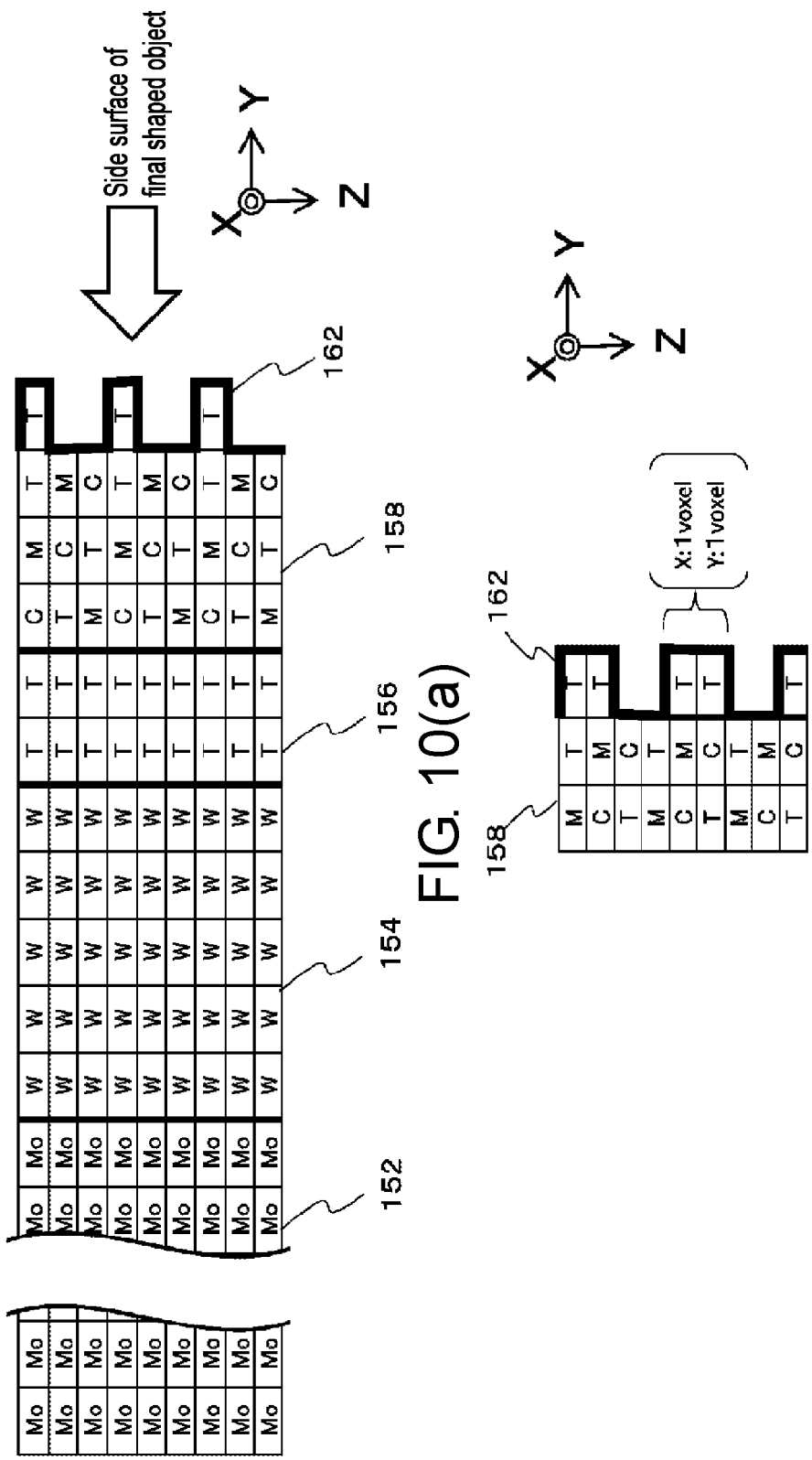

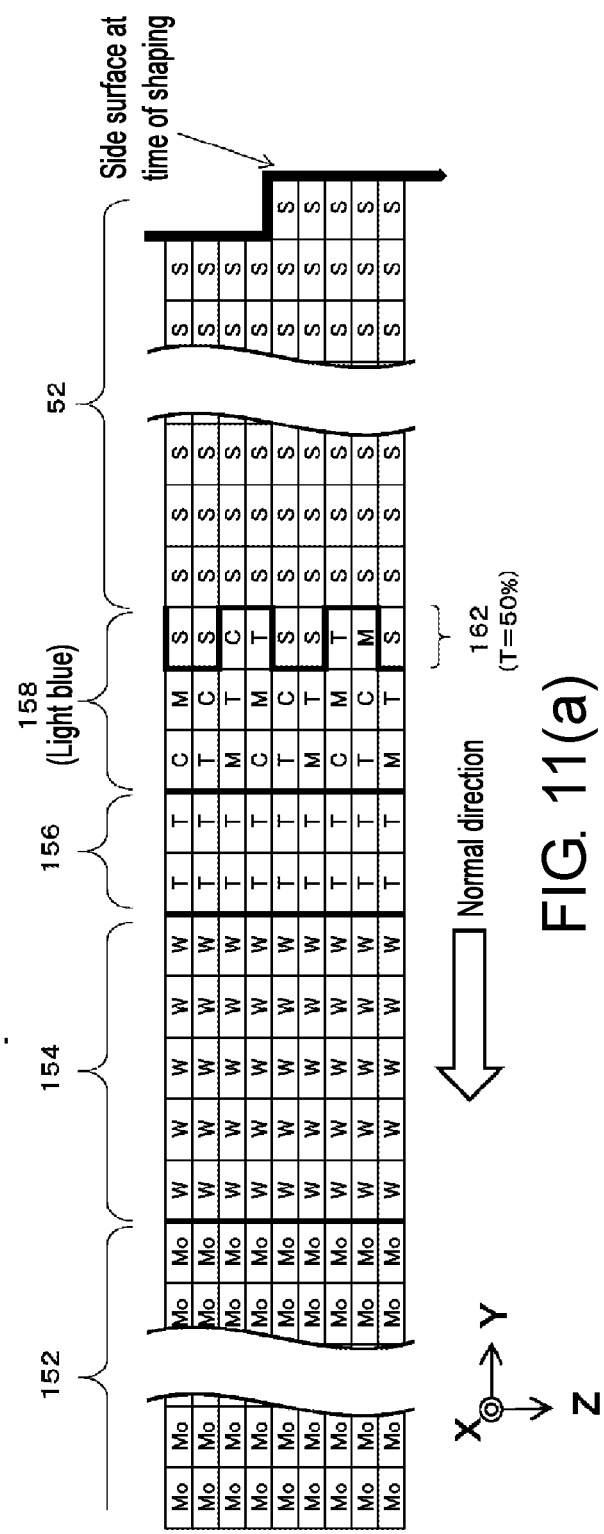
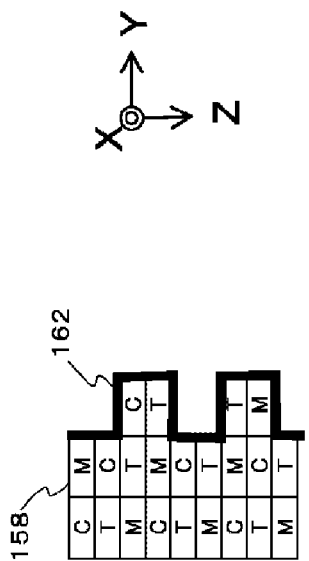
FIG. 11(a)
FIG. 11(b)

SHAPING SYSTEM, SHAPING METHOD, AND SHAPED OBJECT

CROSS-REFERENCE TO RELATED APPLICATION

This application is a 371 application of the international PCT application serial no. PCT/JP2017/037890, filed on Oct. 19, 2017, which claims the priority benefits of Japan application no. 2016-207717, filed on Oct. 24, 2016. The entirety of each of the abovementioned patent applications is hereby incorporated by reference herein and made a part of this specification.

TECHNICAL FIELD

The present invention relates to a shaping system, a shaping method, a method for manufacturing a shaped object, and a shaped object.

BACKGROUND ART

A shaping device (3D printer) that shapes a stereoscopic shaped object is conventionally known (see e.g., Patent Document 1). When shaping a shaped object with such a shaping device, for example, the shaping is performed based on three-dimensional data showing a stereoscopic shape of a shaped object to shape.

CITATION LIST

Patent Document

Patent Document 1: Japanese Unexamined Patent Publication No. 2015-71282

SUMMARY OF INVENTION

Technical Problems

In recent years, the shaped object to shape with the shaping device is not simply shaped to a stereoscopic shape and consideration has been made to apply various decorations to the surface. Furthermore, in this case, it is desired to apply various decorations without imposing a heavy burden on the user. The present invention provides a shaping system, a shaping method, a method for manufacturing a shaped object, and a shaped object capable of solving the above problems.

Solutions to Problems

The inventors of the present application have conducted extensive research on how to shape a shaped object in which decoration is applied on the surface. First, consideration has been made to create data specifying a microscopic structure for obtaining a desired texture or tactile sensation and preventing dirtiness by fingerprints, and a detailed color of each part of the surface at the time of creating three-dimensional data. With such a configuration, for example, the shaped object on which decoration of a desired texture or the like and a color have been applied can be appropriately shaped. However, in this case, the trouble of creating the three-dimensional data is large, and the burden on the user may increase.

On the contrary, the inventors of the present application have considered, through further intensive research, preparing decoration data indicating decoration to be applied on the shaped object apart from the three-dimensional data indicating the shape and the like of the shaped object, and performing shaping based on such data. In this case, for example, the data indicating the shaped object on which decoration has been applied is generated based on the three-dimensional data and the decoration data, and the shaping is performed based on the data.

With such a configuration, for example, a shaped object on which various decorations have been applied can be appropriately shaped without greatly increasing the burden on the user. In this case, for example, the way of applying the decoration can be easily changed by changing the decoration data to be combined with the three-dimensional data. Furthermore, for example, a plurality of types of shaped objects having the same basic shape but different decoration applying methods can be easily shaped by combining the same three-dimensional data with mutually different decoration data.

Furthermore, for example, data in which specification of color is not made, and data in which only one type of color (single color) is specified for the color of the surface are conventionally widely used as the three-dimensional data. In the case of using such three-dimensional data as well, the shaped object on which decoration has been applied can be appropriately shaped by combining with the decoration data. Therefore, with such a configuration, for example, shaped objects on which various decorations have been applied can be appropriately shaped.

Furthermore, the inventors of the present application have found, through further intensive research, the features necessary for obtaining such effects and contrived the present invention. In order to solve the above-mentioned problems, the present invention provides a shaping system that shapes a stereoscopic shaped object, the shaping system including a three-dimensional data inputter that accepts an input of three-dimensional data, which is data indicating at least a stereoscopic shape of the shaped object; a surface data processor that generates decorated shaped object data, which is data indicating the shaped object on which decoration indicated by decoration data has been applied based on the decoration data which is data indicating decoration to be applied on at least a part of the surface of the shaped object and the three-dimensional data; and a shaping executer that executes a shaping operation of the shaped object based on the decorated shaped object data to shape the shaped object on which decoration indicated by the decoration data has been applied.

With this configuration, for example, decorations indicated by the decoration data can be appropriately applied on the shaped object having the shape indicated by the three-dimensional data. The shaped object on which various decorations have been applied, for example, thus can be appropriately shaped.

Applying decoration on the shaped object means, for example, coloring the surface of the shaped object, changing the fine shapes of the surface of the shaped object to change the texture of the surface, and the like. Furthermore, in this case, coloring the surface of the shaped object means, for example, shaping at least a part of the surface using the material for coloring to perform coloring on the surface. Moreover, in this case, for example, it is conceivable to draw an image on the surface of the shaped object, and the like by performing coloring on the surface of the shaped object with a plurality of colors. In addition, changing the texture of the surface means, for example, changing the degree of roughness of the surface or the like. In this case, for example, it is conceivable to form fine irregularities in the form of emboss processing (grain processing) on at least a part of the surface of the shaped object so as to change the texture.

Regarding the decoration that changes the texture of the surface, for example, it is also conceivable to perform decoration for reducing the difference in texture caused by the position of the surface of the shaped object (angle of the shaping surface). For example, in a case where shaping is performed by a layered shaping method using an inkjet head, a difference may occur in the texture of the surface between the side surface of the shaped object and the upper surface or the like. More specifically, when shaping is carried out in this way, for example, the side surface of the shaped object tends to be in a frosted state, for example, due to the influence of the formation of fine irregularities when end faces to be layered are overlapped, the contact with a support layer at the time of shaping, and the like. On the other hand, in the case of a horizontal plane such as an upper surface, for example, the surface tends to be in a glossy state due to the influence of gravity causing the ink dots to be flattened, and the like. Therefore, in such a case, it is conceivable to perform decoration on the horizontal plane such as the upper surface so as to have a frosted state in accordance with the state of the side surface which becomes a frosted state. In this case, for example, it is conceivable to add fine irregularities to the upper surface or the like based on the decoration data. In addition, it is conceivable to bring it into contact with the material of the support layer at the time of shaping. With this configuration, for example, the upper surface and the like can also be formed to a frosted state similar to the side surface. This also appropriately prevents a large difference from generating in the state of the surface of the shaped object by an angle of the shaping surface.

Furthermore, when shaping is performed using an inkjet head, the inkjet head forms a dot of a material corresponding to a voxel, which is a minimum unit of shaping, by, for example, ejecting the material of shaping into a position set according to the resolution of shaping. In this case, it is also conceivable to form irregularities in voxel units on the surface of the shaped object to make the surface of the shaped object into a frosted state, and the like. More specifically, in this case, for example, data indicating to form at least a part of the surface of the shaped object into a matte state is used as the decoration data. Then, in the surface data processor, for example, the decorated shaped object data indicating the shaped object in which a matte region formed into a matted state by decimating some voxels is formed in at least a part of the surface of the shaped object is generated based on the decoration data and the three-dimensional data. Furthermore, in this case, the matte region is, for example, a region formed of a transparent color material on the surface of the shaped object. Moreover, in the case of shaping a shaped object having a coloring region formed of a material for coloring in at least a part of the surface, the region of one part of the coloring region may be considered as the matte region, and the like. In this case, for example, the matte region is formed in at least a part of a portion exposed on the surface of the shaped object in the coloring region.

It is also conceivable to use data indicating various decorations other than the above as the decoration data. For example, in the case of decorating a shaped object by attaching a thin film such as a gold foil, it is conceivable to form a part of the shaped object with a material having adhesiveness capable of attaching a thin film. In this case, for example, it is conceivable to use decoration data indicating a region to be formed of a material having adhesiveness.

Furthermore, it is also conceivable to use a shaping method, a method for manufacturing a shaped object, a shaped object and the like having features similar to those described above as the configuration of the present invention. In this case as well, for example, effects similar to the above can be obtained.

Effect of Invention

According to the present invention, for example, a shaped object on which various decorations are applied can be appropriately shaped.

BRIEF DESCRIPTION OF DRAWINGS

FIG. 1(a) shows an example of a configuration of the shaping system 10. FIG. 1(b) shows one example of a configuration of a main part of a shaping device 12.

FIG. 2(a) shows an example of the configuration of the head portion 102. FIG. 2(b) shows an example of the configuration of the shaped object 50 to be shaped by the shaping device 12.

FIG. 6(a) shows an example of a configuration of the shaped object 50 in a case where the emboss decoration is not performed. FIGS. 6(b) to 6(d) show an example of a specific method of forming irregularities of emboss-processed form. FIG. 6(b) shows an example of a case where the irregularities in the emboss decoration are formed only in a coloring region 158. FIG. 6(c) shows an example of a case where the irregularities in the emboss decoration are formed only in a protective region 160. FIG. 6(d) shows an example of a case where the irregularities in the emboss decoration are formed in a region on an inner side of the coloring region 158.

FIG. 7(a) is a view explaining the effect of performing the emboss decoration. FIG. 7(b) is a view explaining the texture of the surface of the shaped object 50. FIG. 7(c) shows another example of the decoration performed on the shaped object 50.

FIG. 9(a) shows a state of shaping the shaped object 50 in the shaping device 12 in a simplified manner. FIG. 9(b) schematically shows voxels constituting a part of the shaped object 50.

FIG. 10(a) and FIG. 10(b) are views explaining a state after the support layer 52 is removed. FIG. 10(a) shows an example of a state after the support layer 52 is removed.

FIG. 10(b) is a view explaining an alternative embodiment on how to form the matte region 162.

FIG. 11(a) and FIG. 11(b) are views explaining a further alternative embodiment of the configuration of the shaped object 50. FIG. 11(a) schematically shows voxels constituting a part of the shaped object 50 in the present alternative embodiment. FIG. 11(b) shows an example of a state in the vicinity of the matte region 162 after removing the support layer 52.

DESCRIPTION OF EMBODIMENTS

Figure 1A:
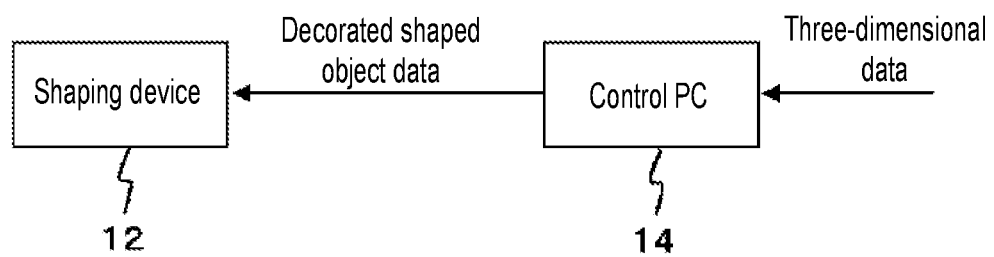
FIG. 1(a) and FIG. 1(b) are views showing one example of a shaping system 10 according to one embodiment of the present invention.
Figure 1B:
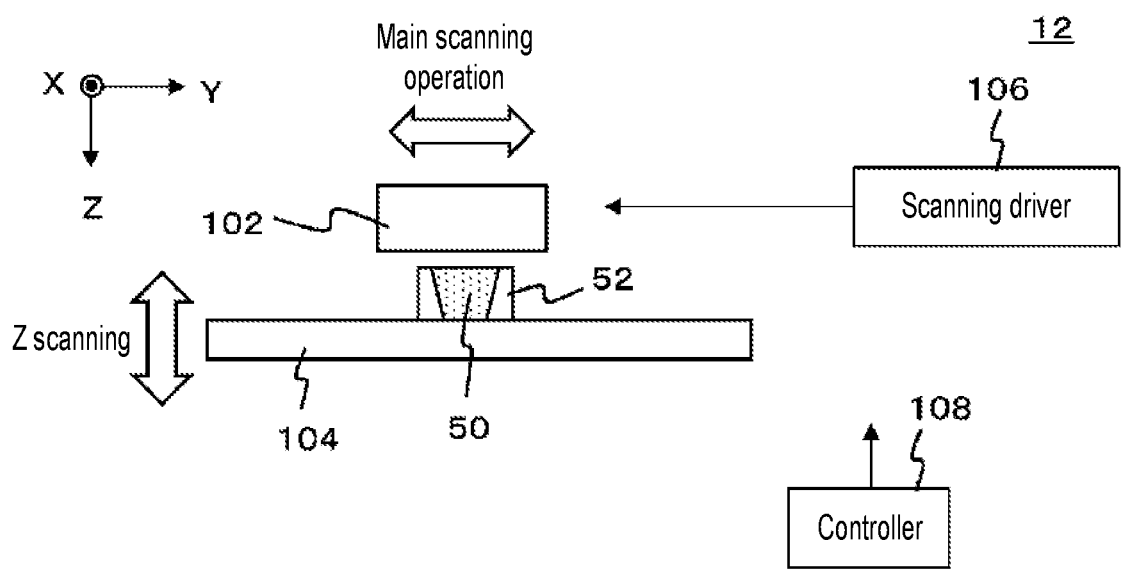

Hereinafter, an embodiment according to the present invention will be described with reference to the drawings. FIG. 1(a) and FIG. 1(b) show one example of a shaping system 10 according to one embodiment of the present invention. FIG. 1(a) shows an example of a configuration of the shaping system 10. In this example, the shaping system 10 is a shaping system for shaping a stereoscopic shaped object, and includes a shaping device 12 and a control PC 14.

The shaping device 12 is a device that executes shaping of a shaped object, and shapes a shaped object according to the control of the control PC 14. More specifically, the shaping device 12 is a full-color shaping device capable of shaping a shaped object colored in full color, and receives decorated shaped object data, which is data indicating the shaped object on which decoration specified by a user (operator) has been applied, from the control PC 14, and shapes a shaped object based on the decorated shaped object data. Furthermore, the shaping device 12 thereby shapes a shaped object on which decoration specified by the user has been applied. A more specific configuration of the shaping device 12, decoration specified by the user, and the like will be described in more detail later.

The control PC 14 is a computer (host PC) that controls the operation of the shaping device 12. In this example, the shaping device 12 externally receives three-dimensional data which is data showing at least the stereoscopic shape of the shaped object. Furthermore, the specification of decoration to be applied on the shaped object is received from the user. Then, the decorated shaped object data is generated based on the decoration data which is data indicating the specified decoration and the three-dimensional data. Then, the generated decorated shaped object data is provided to the shaping device 12. Furthermore, the control PC 14 thereby controls the shaping operation by the shaping device 12.

In this example, the decoration data is, for example, data indicating the decoration to be applied on at least a part of the surface of the shaped object. In addition, the decorated shaped object data is, for example, data indicating a shaped object on which the decoration indicated by the decoration data has been applied. The 3D data of various known formats can be used as the three-dimensional data. For example, 3D data indicating an object for which color has not been specified can be used for the three-dimensional data. Furthermore, it is also conceivable to use 3D data in which a single color is set as the three-dimensional data. Moreover, for example, 3D data or the like in which a color in full color is specified for each position on the surface may be used as the three-dimensional data.

In addition, as described above, in the present example, the control PC 14 externally receives three-dimensional data. However, in a variant of the shaping system 10, the control PC 14 may generate three-dimensional data based on, for example, a user's instruction. Furthermore, in the variant of the shaping system 10, the control PC 14 may, for example, externally receive the decoration data. In this case, for example, the control PC 14 may externally receive the three-dimensional data and the decoration data. The specific configuration and operation of the control PC 14 in the present example will be described in more detail later.

Furthermore, as described above, in the present example, the shaping system 10 is configured by a plurality of devices, which are the shaping device 12 and the control PC 14. However, in a variant of the shaping system 10, the shaping system 10 may be configured by a single device. In this case, for example, it is conceivable to configure the shaping system 10 with one shaping device 12 including the function of the control PC 14.

Next, a specific configuration of the shaping device 12 will be described. FIG. 1(b) shows one example of a configuration of a main part of a shaping device 12. In this example, the shaping device 12 is an example of a shaping executer that shapes a shaped object 50 on which decoration indicated by the decoration data has been applied, and includes a head portion 102, a shaping table 104, a scanning driver 106, and a controller 108.

Other than the points described below, the shaping device 12 may have a configuration same as or similar to a known shaping device. More specifically, other than the points described below, the shaping device 12 may have a configuration same as or similar to, for example, a known shaping device that carries out shaping by ejecting a droplet to become the material of a shaped object 50 using an inkjet head. Furthermore, other than the illustrated configuration, the shaping device 12 may also include, for example, various types of configurations necessary for shaping, coloring, and the like of the shaped object 50. Moreover, in this example, the shaping device 12 is a shaping device (3D printer) that shapes a stereoscopic shaped object 50 by a layered shaping method. In this case, the layered shaping method is, for example, a method of shaping the shaped object 50 by overlapping a plurality of layers. The shaped object 50 means, for example, a stereoscopic three-dimensional structural object. The features of the shaped object 50 on which decoration indicated by the decoration data has been applied will be described in more detail later.

The head portion 102 is a portion that ejects the material of the shaped object 50. Furthermore, in this example, ink is used as the material of the shaped object 50. In this case, the ink means, for example, liquid ejected from the inkjet head. More specifically, the head portion 102 ejects ink that cures according to predetermined conditions from a plurality of inkjet heads as a material of the shaped object 50. Then, by curing the ink after landing, the respective layers constituting the shaped object 50 are overlapped and formed to shape a shaped object by the layered shaping method. Moreover, in the present example, an ultraviolet curable ink (UV ink) that cures from a liquid state by irradiation of ultraviolet light is used as the ink.

Further, the head portion 102 further ejects a material of a support layer 52 in addition to the material of the shaped object 50. The shaping device 12 thereby forms the support layer 52 at a periphery of the shaped object 50 as necessary. In this case, the support layer 52 means, for example, a layered structural object that supports the shaped object 50 by surrounding the outer periphery of the shaped object 50 being shaped. The support layer 52 is formed as necessary at the time of shaping of the shaped object 50 and removed after the completion of the shaping.

The shaping table 104 is a table-shaped member that supports the shaped object 50 being shaped, and is disposed at a position facing the inkjet head in the head portion 102, and has the shaped object 50 being shaped placed on the upper surface thereof. Furthermore, in the present example, the shaping table 104 has a configuration in which at least the upper surface is movable in a layering direction (Z direction in the figure), and moves at least the upper surface in accordance with the progress of the shaping of the shaped object 50 by being driven by a scanning driver 106. In this case, the layering direction means, for example, a direction in which the material of shaping is layered in the layered shaping method. More specifically, in this example, the layering direction is a direction orthogonal to the main scanning direction (Y direction in the figure) and the sub-scanning direction (X direction in the figure).

The scanning driver 106 is a driver that causes the head portion 102 to perform a scanning operation of relatively moving with respect to the shaped object 50 being shaped. In this case, "relatively moving with respect to the shaped object 50 being shaped" means, for example, relatively moving with respect to the shaping table 104. Causing the head portion 102 to perform a scanning operation means, for example, causing the inkjet head of the head portion 102 to perform a scanning operation. Furthermore, in the present example, the scanning driver 106 causes the head portion 102 to perform a main scanning operation (Y scanning), a sub-scanning operation (X scanning), and a layering direction scanning (Z scanning).

The main scanning operation means, for example, an operation of ejecting ink while moving in the main scanning direction. In this example, the scanning driver 106 causes the head portion 102 to perform the main scanning operation by fixing the position of the shaping table 104 in the main scanning direction and moving the head portion 102 side. Furthermore, for example, the scanning driver 106 may move the shaped object 50 side by fixing the position of the head portion 102 in the main scanning direction and moving, for example, the shaping table 104.

The sub-scanning operation means, for example, an operation of relatively moving with respect to the shaping table 104 in the sub-scanning direction orthogonal to the main scanning direction. More specifically, the sub-scanning operation is, for example, an operation of relatively moving with respect to the shaping table 104 in the sub-scanning direction by a feed amount set in advance. In the present example, the scanning driver 106 causes the head portion 102 to perform a sub-scanning operation by fixing the position of the head portion 102 in the sub-scanning direction and moving the shaping table 104 between the main scanning operations. Furthermore, the scanning driver 106 may cause the head portion 102 to perform a sub-scanning operation by fixing the position of the shaping table 104 in the sub-scanning direction and moving the head portion 102.

The layering direction scanning means, for example, an operation of relatively moving the head portion 102 in the layering direction with respect to the shaped object 50 by moving at least one of the head portion 102 or the shaping table 104 in the layering direction. Furthermore, the scanning driver 106 adjusts the relative position of the inkjet head with respect to the shaped object 50 being shaped in the layering direction by causing the head portion 102 to perform the layering direction scanning in accordance with the progress of the shaping operation. More specifically, in the present example, the scanning driver 106 fixes the position of the head portion 102 in the layering direction and moves the shaping table 104. The scanning driver 106 may fix the position of the shaping table 104 in the layering direction and move the head portion 102.

The controller 108 is, for example, a CPU of the shaping device 12, and controls the operation of shaping of the shaped object 50 by controlling each portion of the shaping device 12. In addition, in the present example, the controller 108 controls each portion of the shaping device 12 based on the decorated shaped object data received from the control PC 14. According to the present example, the shaped object 50 can be appropriately shaped.

Next, a configuration of the head portion 102 in the shaping device 12 and an example of the configuration of the shaped object 50 shaped by the shaping device 12 will be described in more detail. FIG. 2(*a*) and FIG. 2(*b*) are views describing the configuration of the head portion 102 and the shaped object 50. FIG. 2(*a*) shows an example of the configuration of the head portion 102.

In the present example, the head portion 102 includes a plurality of inkjet heads, a plurality of ultraviolet light sources 204, and a flattening roller 206. As shown in the figure, an inkjet head 202*s*, an inkjet head 202*mo*, an inkjet head 202*w*, an inkjet head 202*y*, an inkjet head 202*m*, an inkjet head 202*c*, an inkjet head 202*k*, and an inkjet head 202*t* are provided as a plurality of inkjet heads. The plurality of inkjet heads are, for example, arranged side by side in the main scanning direction with their positions in the sub-scanning direction aligned. Furthermore, each inkjet head includes a nozzle row, in which a plurality of nozzles are arranged in a predetermined nozzle row direction, on a surface facing the shaping table 104. Furthermore, the present example, the nozzle row direction is a direction parallel to the sub-scanning direction.

Among the inkjet heads, the inkjet head 202*s* is an inkjet head that ejects the material of the support layer 52. For example, a known material for the support layer can be suitably used for the material of the support layer 52. The inkjet head 202*mo* is an inkjet head that ejects shaping material ink (Mo ink). In this case, the shaping material ink is, for example, an ink dedicated for shaping used for the shaping of the interior (inner region) of the shaped object 50.

The interior of the shaped object 50 is not limited to the shaping material ink, and may be formed by further using inks of other colors. Furthermore, for example, it is also conceivable to form the interior of the shaped object 50 with only ink of another color (e.g., white ink, etc.) without using the shaping material ink. In this case, the inkjet head 202*mo* may be omitted in the head portion 102.

The inkjet head 202*w* is an inkjet head that ejects white (W) ink. In addition, in the present example, the white ink is an example of a light reflective ink, and is used, for example, when forming a region (light reflecting region) having a property of reflecting light in the shaped object 50.

The inkjet head 202*y*, the inkjet head 202*m*, the inkjet head 202*c*, and the inkjet head 202*k* (hereinafter referred to as the inkjet heads 202*y* to 202*k*) are coloring inkjet heads used at the time of shaping the colored shaped object 50. More specifically, the inkjet head 202*y* ejects ink of yellow color (Y color). The inkjet head 202*m* ejects ink of magenta color (M color). The inkjet head 202*c* ejects ink of cyan color (C color). Furthermore, the inkjet head 202*k* ejects ink of black color (K color). In addition, in this case, each color of YMCK is an example of process colors used for full color representation by a subtractive color mixing method. The inks of respective colors are an example of a colored material for coloring. The inkjet head 202*t* is an inkjet head that ejects a clear ink. The clear ink means, for example, a clear color ink which is a colorless transparent color (T).

The plurality of ultraviolet light sources 204 are light sources (UV light sources) for curing the ink, and generate an ultraviolet light for curing the ultraviolet curable ink. Moreover, in the present example, each of the plurality of ultraviolet light sources 204 is disposed on one end side and the other end side in the main scanning direction in the head portion 102 so as to sandwich the plurality of inkjet heads in between. For example, UVLED (ultraviolet LED) and the like can be suitably used for the ultraviolet light source 204. Furthermore, it is also conceivable to use a metal halide lamp, a mercury lamp, and the like for the ultraviolet light source 204.

The flattening roller 206 is a flattening means for flattening the layer of the ink formed during the shaping of the shaped object 50. Furthermore, for example, the flattening roller 206 flattens the layer of ink by coming into contact with a surface of the layer of ink and removing one part of the ink before curing at the time of the main scanning operation.

The layer of ink constituting the shaped object 50 can be appropriately formed by using the head portion 102 having the above configuration. Furthermore, the shaped object 50 can be appropriately formed by forming the plurality of layers of inks in an overlapping manner.

The specific configuration of the head portion 102 is not limited to the configuration described above and can be variously modified. For example, the head portion 102 may further include an inkjet head for colors other than the above as an inkjet head for coloring. In addition, the arrangement of a plurality of inkjet heads in the head portion 102 can be variously modified. For example, some inkjet heads may be disposed so as to be shifted in position in the sub-scanning direction from the other inkjet heads.

Figure 2A:
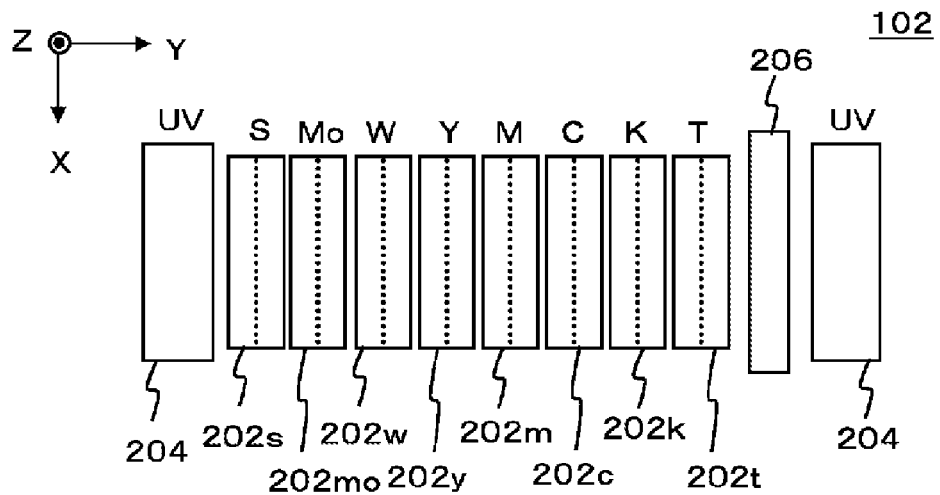
FIG. 2(a) and FIG. 2(b) are views explaining a configuration of a head portion 102 and a shaped object 50.
Figure 2B:
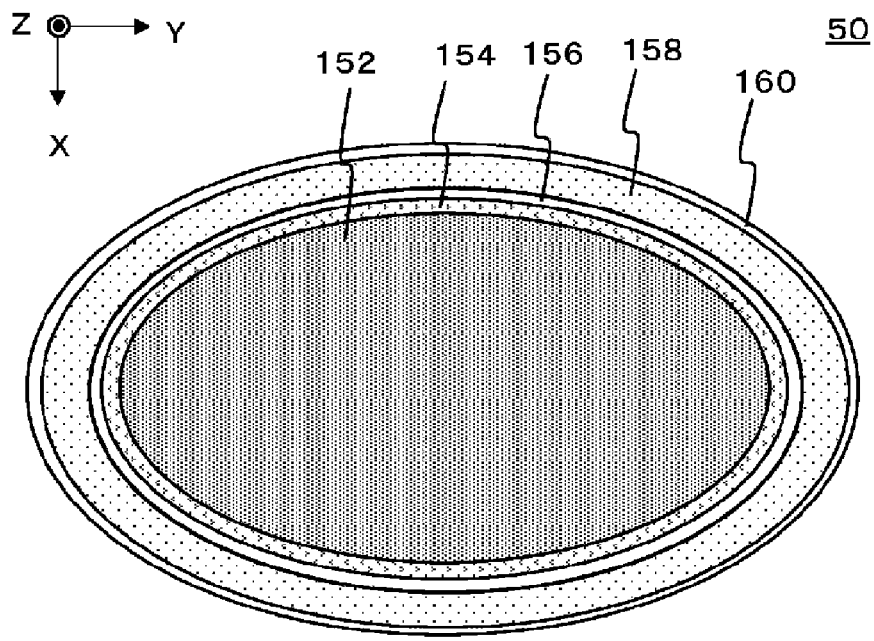

FIG. 2(b) is a view showing an example of the configuration of the shaped object 50 shaped by the shaping device 12, and shows an example of a configuration of a cross-section of the shaped object 50 in the case of shaping an ellipsoid shaped object 50. Furthermore, as shown in the figure, the illustrated cross section is an X-Y cross section perpendicular to the Z direction. In this case, the configuration of the Z-X cross section and the Z-Y cross section of the shaped object 50 perpendicular to the Y direction and the Z direction also have similar configuration.

In addition, in FIG. 2(b), the configuration of the shaped object 50 is shown in a simplified manner for the case of shaping the shaped object 50 in which the surface is colored. In this case, having the surface of the shaped object 50 colored means that, for example, at least a part of the region of the shaped object 50 where the hue can be visually recognized from outside is colored. In this case, for example, as shown in the figure, the shaping device 12 shapes the shaped object 50 including an interior region 152, a light reflecting region 154, a separating region 156, a coloring region 158, and a protective region 160.

The interior region 152 is a region that constitutes the interior of the shaped object 50. Furthermore, the interior region 152 can be considered as, for example, a region (shaping region) constituting the shape of the shaped object 50. In the present example, the head portion 102 forms the interior region 152 using the shaping material ink ejected from the inkjet head 202mo.

The light reflecting region 154 is a region for reflecting light entering from the outer side of the shaped object 50 through the coloring region 158 and the like. In the present example, the head portion 102 forms the light reflecting region 154 at the periphery of the interior region 152 by using the white ink ejected from the inkjet head 202w.

The separating region 156 is a transparent region (transparent layer) that prevents the ink constituting the light reflecting region 154 and the ink constituting the coloring region 158 from mixing. In the present example, the head portion 102 forms the separating region 156 at the periphery of the light reflecting region 154 by using the clear ink ejected from the inkjet head 202t.

The coloring region 158 is a region to be colored with ink for coloring ejected from the inkjet heads 202y to 202k. In this case, the ink for coloring is an example of a material for coloring. In the present example, the head portion 102 forms the coloring region 158 at the periphery of the separating region 156 using the ink for coloring ejected from the inkjet heads 202y to 202k and the clear ink ejected from the inkjet head 202t. Furthermore, the coloring region 158 is thereby formed on the outer side of the interior region 152 and the like. In this case, for example, various colors are represented by adjusting the ejection amount of ink for coloring of each color to each position. The clear ink is used to compensate for the change in the amount of ink for coloring (ejection amount per unit volume is 0% to 100%) caused by the difference in color to a constant 100%. According to such a configuration, for example, each position of the coloring region 158 can be appropriately colored with a desired color.

The protective region 160 is a transparent region (outer transparent region) for protecting the outer surface of the shaped object 50. In the present example, the head portion 102 forms the protective region 160 at the periphery of the coloring region 158 by using clear ink ejected from the inkjet head 202t. The head portion 102 thereby forms the protective region 160 so as to cover the outer side of the coloring region 158 using a transparent material. The shaped object 50 in which the surface is colored can be appropriately formed by forming the respective regions as described above.

In a variant of the configuration of the shaped object 50, the specific configuration of the shaped object 50 may be made different from the above. More specifically, for example, it is conceivable to form the interior region 152 having also the function of the light reflecting region 154 using, for example, white ink without distinguishing the interior region 152 and the light reflecting region 154. It is also conceivable to omit the separating region 156, the coloring region 158, and the like.

Furthermore, in the shaping device 12, for example, it is also conceivable to shape the shaped object 50 that is not colored. In this case, the shaping device 12 shapes the shaped object 50 having, for example, a configuration in which a part of the region is omitted from the configuration shown in FIG. 2(b). More specifically, in this case, it is conceivable to omit, for example, the light reflecting region 154, the separating region 156, the coloring region 158, and the like. Furthermore, as will be described in detail later, in the present example, it is also conceivable to form fine irregularities in an emboss-processed form on the surface of the shaped object 50 as a decoration on the shaped object 50. However, in FIG. 2(b), illustration is made with such fine irregularities and the like omitted for the sake of convenience of illustration. The decoration of the emboss-processed form will be explained in more detail later.

Next, the specific configuration and the operation of the control PC14 will be described in more detail. As described above, the control PC 14 receives specification of decoration to be applied on the shaped object from the user. Then, the decorated shaped object data is generated based on the decoration data indicating the specified decoration and the three-dimensional data. Furthermore, the generated decorated shaped object data is provided to the shaping device 12 (see FIG. 1(a) and FIG. 1(b)).

More specifically, in the present example, the control PC 14 accepts specification of a emboss pattern, specification of a color of the shaped object 50, and specification of an image to be drawn on the shaped object 50 as the specification of decoration to be applied on the shaped object. Furthermore, the control PC 14 has a configuration for performing the respective decoration in accordance with these specifiable decorations.

Figure 3:
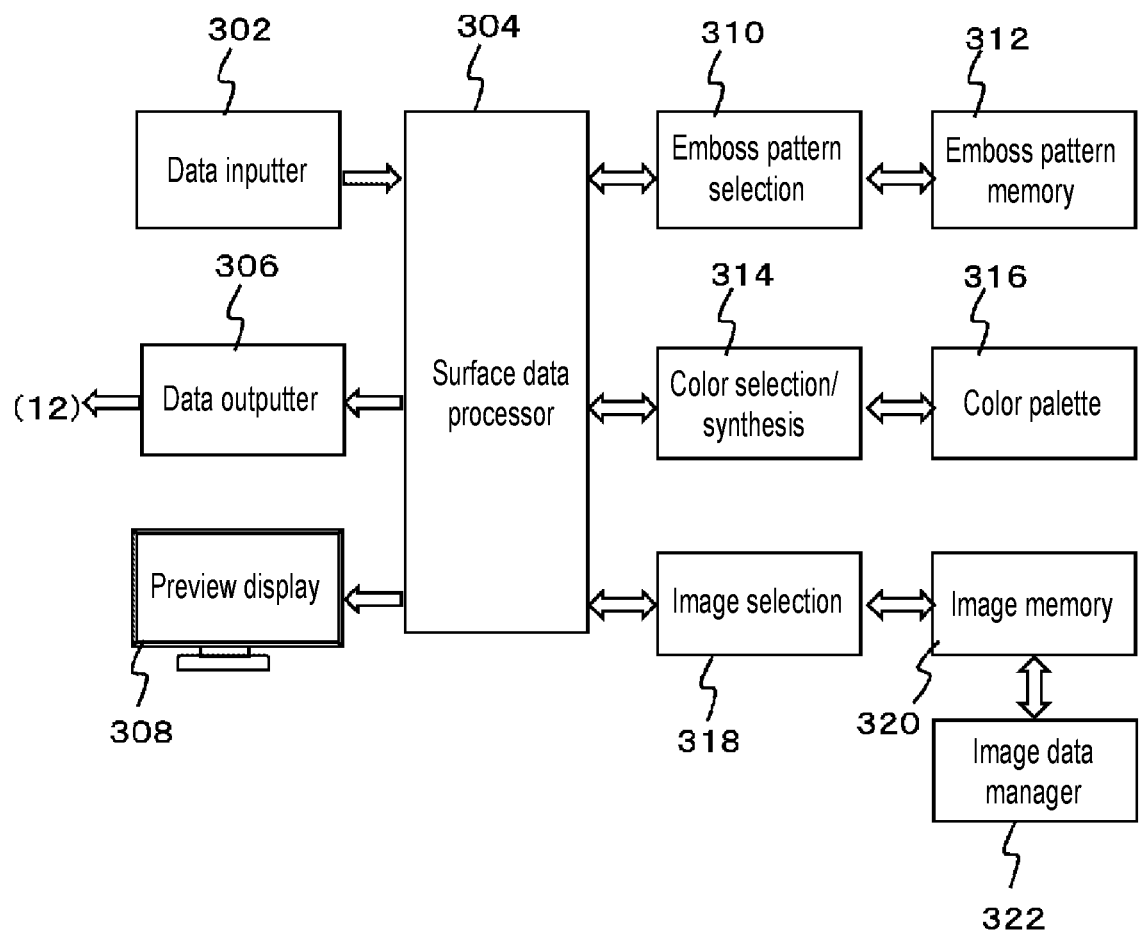
FIG. 3 is a function block diagram showing an example of a configuration of a main part of a control PC 14.

FIG. 3 is a function block diagram showing an example of a configuration of a main part of the control PC 14. In the present example, the control PC 14 includes a data inputter 302, a surface data processor 304, a data outputter 306, a display portion 308, a pattern selector 310, a emboss pattern memory 312, a color selector 314, a color palette 316, an image selector 318, an image memory 320, and an image data manager 322. FIG. 3 shows various functions of the control PC 14 divided into blocks so as to explain the functional features. Therefore, each block does not necessarily correspond to a physical configuration (e.g., unit of electronic circuit, etc.) in the control PC 14.

The data inputter 302 is an example of a three-dimensional data inputter, and for example, accepts input of three-dimensional data provided from the outside of the control PC 14. The data inputter 302 accepts input of the three-dimensional data via, for example, a communication path such as the Internet or a storage medium such as a memory card.

The surface data processor 304 is a processor that generates the decorated shaped object data based on the decoration data and the three-dimensional data. In the present example, the surface data processor 304 acquires the decoration data indicating the decoration to be applied on at least a part of the surface of the shaped object 50 (see FIG. 1(*a*) and FIG. 1(*b*)) via the pattern selector 310, the color selector 314, and the image selector 318. In this case, the pattern selector 310, the color selector 314, and the color palette 316 are examples of the decoration specification acceptor, and accept specification on how to perform decoration on at least a part of the surface of the shaped object 50 from the user.

In addition, the surface data processor 304 processes the three-dimensional data based on the decoration data received from the pattern selector 310 or the like to generate decorated shaped object data indicating the shaped object 50 to which the decoration has been applied. In this case, processing the three-dimensional data based on the decoration data means, for example, adding decoration indicated by the decoration data to the surface of the object indicated by the three-dimensional data. Furthermore, adding decoration means, for example, adding an irregularity shape (irregularity design) corresponding to a specified emboss pattern, coloring of a specified color, or adding of a specified image to the surface of the shaped object 50. The surface of the shaped object 50 means, for example, a region where texture and hue can be confirmed from the outside in the shaped object 50.

The data outputter 306 is an outputter that outputs the decorated shaped object data generated by the surface data processor 304. The data outputter 306 provides the decorated shaped object data to the shaping device 12 by, for example, outputting the decorated shaped object data through a communication path or a storage medium. The display portion 308 is, for example, a display device such as a monitor, and executes preview display of the decoration to be applied on the shaped object 50.

The pattern selector 310 and the emboss pattern memory 312 are configured to specify an emboss pattern as specification of decoration. In this case, the emboss pattern means, for example, data indicating a pattern of irregularities formed into an emboss-processed form. In this case, the pattern of irregularities means a pattern showing, for example, the shape and arrangement of irregularity. Furthermore, the irregularity formed into an emboss-processed form means, for example, irregularity similar to the emboss (wrinkle) formed in the emboss processing (wrinkle processing) performed in a press die or the like. The emboss processing means, for example, a process of forming a fine design (irregularities) without mirror-finishing the surface. Furthermore, in this case, the emboss means the fine design.

Furthermore, in the present example, the pattern selector 310 presents to the user a plurality of types of emboss patterns different from each other by displaying the emboss pattern stored in the emboss pattern memory 312 on the display portion 308. Then, the specification on the way of decoration is accepted from the user by allowing the user to select one of the emboss patterns. Then, the decoration data corresponding to the selected emboss pattern is provided to the surface data processor 304. In this case, the decoration data corresponding to the emboss pattern means, for example, decoration data indicating to apply decoration of forming irregularity of emboss-processed form on the surface of the shaped object 50 according to the emboss pattern.

Furthermore, the emboss pattern memory 312 is a memory for storing a plurality of types of emboss patterns set in advance. In this case, it is conceivable to use patterns corresponding to various textures such as hairline, pearskin finish, grain, rock, sand, fabric design, geometric design, and the like as the plurality of types of emboss patterns. It is also preferable to store a pattern corresponding to a case where decoration of an emboss-processed form is not applied as one of the emboss patterns, and cause the pattern selector 310 to present the pattern.

Furthermore, the emboss pattern memory 312 further stores the shape of irregularities to be formed at the time of decoration on the shaped object 50 in association with each emboss pattern. In this case, it is sometimes preferable to change not only the shape of the irregularity but also the color in accordance with the design with respect to at least some patterns such as hairline, grain, fabric design, or the like. Therefore, in such a case, it is preferable that the emboss pattern memory 312 also store color information in association with the emboss pattern.

The color selector 314 and the color palette 316 are configured to perform specification of colors as specification of decoration. In this case, the specification of color refers to specifying a color to be colored, for example, for at least a part of the surface of the shaped object 50. Furthermore, in the present example, the specification of color refers to specifying a color to be colored in the coloring region 158 (see FIG. 2(*a*) and FIG. 2(*b*)) of the shaped object 50. The color selector 314 accepts from the user an instruction for specification of color in a manner same as or similar to, for example, a known method for when printing a two-dimensional image. In this case, the color selector 314 accepts specification from the user, for example, by selection (color selection) from a color palette, color synthesis by numerical value specification of RGB, or the like with respect to the color to perform coloring on the surface of the shaped object 50. Furthermore, in this case, for example, the user is caused to select and determine the color while confirming the result of the decoration by displaying the preview image on the display portion 308. In response to the specification of color by the user, the color selector 314 provides the decoration data indicating the color to be colored on the shaped object 50 to the surface data processor 304. Furthermore, the color palette 316 is a storage portion (color palette memory) that stores a color palette that causes the user to select a color.

The image selector 318, the image memory 320, and the image data manager 322 are configured to perform specification of images as specification of decoration. In this case, the specification of image means, for example, an image to be drawn on at least a part of the surface of the shaped object 50. Drawing an image on the surface of the shaped object 50 means, for example, forming a picture corresponding to the image using inks for coloring of a plurality of colors with respect to the coloring region 158 of the shaped object 50, and means forming so that the specified image can be visually recognized from the outside. Moreover, for example, it is conceivable to use a color pattern, a CG image, a photographic image, or the like as an image to be used for the decoration of the shaped object 50.

Furthermore, at the time of specifying an image, for example, the image selector 318 reads out an image stored in the image memory 320, and displays it on the display portion 308 to present a selectable image to the user. The selection of the user is thus accepted for the image to be used for the decoration of the shaped object 50. The image selector 318 then provides the decoration data indicating the image data specified by the user to the surface data processor 304.

Furthermore, the image memory 320 is a memory that stores an image to be used for decoration of the shaped object 50. In this example, the image memory 320 stores, for example, a plurality of images acquired via the image data manager 322. The image data manager 322 is a managing portion that manages the memory to be stored in the image memory 320, and writes the image data indicating an image for decoration into the image memory 320 and erases the image data from the image memory 320. Furthermore, the image data manager 322 acquires an image from the outside of the control PC 14, for example, via a communication path, a storage medium, or the like, as necessary.

As described above, in the present example, the control PC 14 generates the decorated shaped object data based on the decoration data and the three-dimensional data. Further, in this case, the control PC 14 may generate the decorated shaped object data using a plurality of sets of decoration data. More specifically, for example, the surface data processor 304 in the control PC 14 may receive the decoration data from each of the pattern selector 310, the color selector 314, and the image selector 318, and generate the decorated shaped object data based on the plurality of sets of decoration data and the three-dimensional data. Furthermore, the surface data processor 304 may use one or two sets of decoration data received from one or two configurations of the pattern selector 310, the color selector 314, and the image selector 318 to generate the decorated shaped object data.

Figure 4:
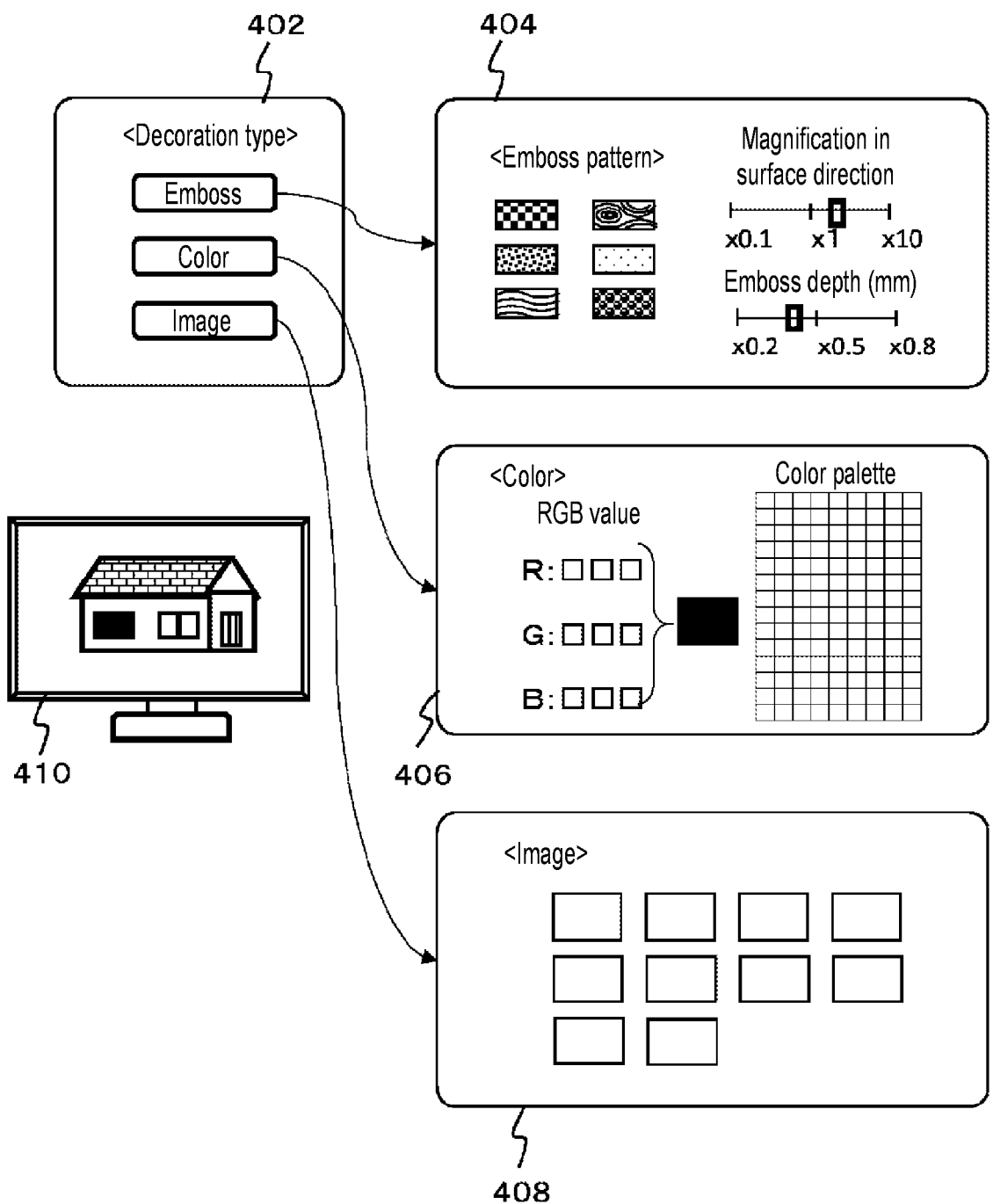
FIG. 4 is a view showing an example of a configuration of an operation screen at the time of specifying decoration.

Which specification, the specification of the emboss pattern, the specification of color of the shaped object 50, and the specification of image to be drawn on the shaped object 50 to receive from the user can be determined according to, for example, the user's operation on the operation screen (GUI) displayed on the display portion 308. FIG. 4 shows an example of a configuration of an operation screen displayed at the time of the specifying decoration.

As described above, in the present example, the control PC 14 accepts from the user the specification of the emboss pattern, the specification of color of the shaped object 50, and the specification of image to be drawn on the shaped object 50. In addition, in this case, the selection and the specification of conditions concerning each decoration are accepted from the user via, for example, selection of an icon, click on a pattern or palette, slide of a bar, input of a numerical value, or the like. Furthermore, in this case, not all these specifications are necessarily accepted, and only the specification related to the decoration selected by the user may be accepted.

Therefore, on the operation screen, first, for example, the selection of the user is accepted on which one of emboss (emboss pattern), color, and image to specify by showing a screen indicated as a screen 402 in the figure on the display portion 308 (see FIG. 3). Then, in response to this selection, the screen displayed on the display portion 308 is caused to transition to the screens 404, 406, and 408 that receive the respective specifications of the emboss pattern, the color, and the image, respectively. Furthermore, a more specific specification on decoration is accepted from the user on the screen after the transition. Moreover, while receiving the user's instruction on the screens 404, 406, and 408, a preview image for decoration checking is displayed on the display portion 308, for example, as shown on the screen 410, as necessary.

Furthermore, for example, various kinds of information related to each decoration described with reference to FIG. 3 are displayed on the screen 404, the screen 406, and the screen 408. For example, on the screen 404 for specification of emboss pattern, a plurality of types of selectable emboss patterns are displayed. Furthermore, in the present example, on the screen 404, a display for receiving the specification of the user is also made for the magnification (surface direction magnification) at which to apply the emboss pattern and the depth (emboss depth) of the emboss in addition to the emboss pattern. In this case, the magnification at which to apply the emboss pattern means a magnification indicating the magnitude of the irregularity pattern actually formed on the surface of the shaped object 50 in comparison with a predetermined reference magnitude. A period (pitch) at which to form the design of the pattern within a plane of the surface of the shaped object 50 can be changed by changing the magnification at which to apply the emboss pattern. In addition, the depth of the emboss means, for example, the height of the irregularities constituting the emboss. With such a configuration, a more variety of decorations can be carried out using the emboss pattern.

Furthermore, for example, selection from a color palette and display for numerical specification of RGB are performed on the screen 406 for specification of color. The display of selectable images is performed on the screen 408 for specification of image. According to the present example, the specification of decoration, for example, can be appropriately accepted from the user.

Although not shown in FIG. 4, the control PC 14 further accepts from the user specification of a decorating region on which the respective decoration is to be applied, for example, at the time of specifying each of emboss pattern, the color, and the image. In this case, the decorating region means a region on which respective decoration is to be applied in the surface of the shaped object 50. Furthermore, it is conceivable to specify either the entire surface or a portion of the surface of the shaped object 50, for example, as the specification of the decorating region. Moreover, in a case of specifying a portion, it is conceivable to specify a region to be decorated, for example, using a rectangle, an ellipse, an arbitrary shape, or the like. Furthermore, for example, in a case where an object indicated by the three-dimensional data is composed of a plurality of parts, the decorating region may be specified by specifying the part to be decorated.

The setting of the decoration to be performed on each part of the surface of the shaped object 50 is preferably carried out by processes such as copy and paste, as necessary. In this case, for example, it is conceivable to copy the information (surface information) on the decoration to be applied on the selected region and paste it on other regions in the surface of the shaped object 50.

The pattern may become discontinuous at the start point or the end point depending on the type of emboss pattern in a case where decoration using the emboss pattern is performed on a part of the surface of the shaped object 50. Furthermore, such discontinuity may occur according to the relationship between the emboss pattern and the shape of the shaped object 50. More specifically, for example, in a case of using the emboss pattern such as hair line, grain, or fabric design, and the like, it is conceivable that the connecting portion becomes discontinuous at the end on the surface of the shaped object 50. Therefore, in such a case, the adjustment of the connecting part is preferably carried out by, for example, appropriately deforming the region on which the decoration with the emboss pattern is to be applied.

Furthermore, in a case of performing emboss decoration, for example, it is also conceivable to form convex portions of irregularities in units of one voxel, which is the minimum unit of resolution of shaping. In this case, for example, data in which convex portions are arranged by an error diffusion method or a dither method with the density of the convex portions as concentration, may be used as the decoration data. Arranging the convex portions by the error diffusion method or the dither method with the density of the convex portions as the concentration means, for example, performing a process of handling the concentration of the convex portion in a manner same as or similar to the process of handling the density of the color in the halftone process, and determining the arrangement of the convex portions by the error diffusion method or the dither method.

Figure 5:
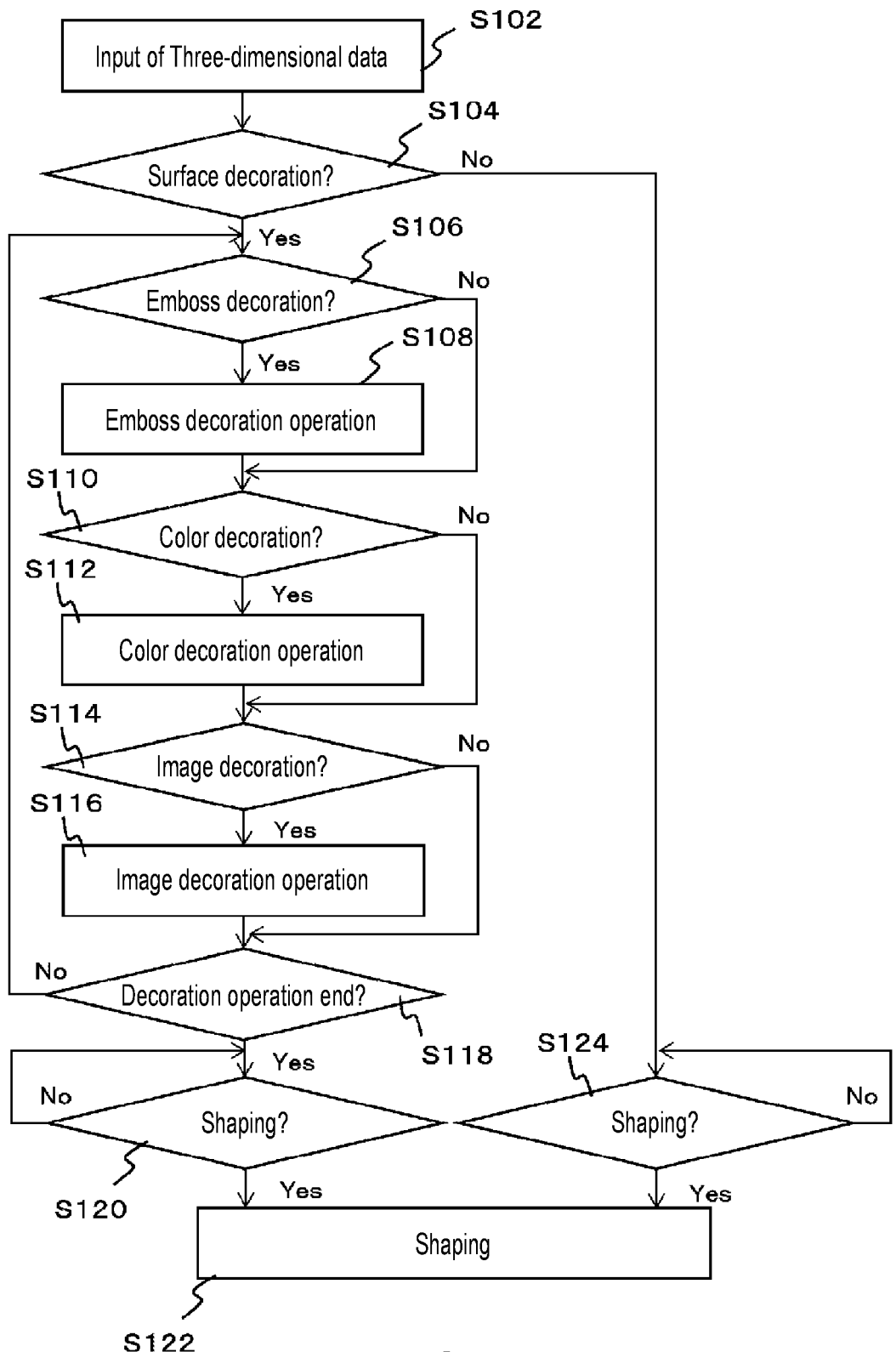
FIG. 5 is a flowchart showing one example of an operation of the control PC 14.

Subsequently, the operation of the control PC 14 will be described with reference to a flowchart. FIG. 5 is a flowchart showing one example of an operation of the control PC 14. In the present example, when shaping the shaped object 50, the control PC 14 first accepts input of three-dimensional data at the data inputter 302 (S102). Then, whether or not to perform decoration (surface decoration) on the surface of the shaped object 50 is determined on the basis of, for example, an instruction from the user (S104). Then, in a case where the surface decoration is performed (S104: Yes), whether or not to perform decoration (emboss decoration) of forming fine irregularities in the emboss-processed form is further determined on the basis of, for example, an instruction from the user (S106). In a case where the emboss decoration is performed (S106: Yes), the operation of the user regarding the emboss decoration is accepted (S108), and the process proceeds to the next step S110. In a case where the emboss decoration is not performed (S106: No), the process proceeds to the next step S110 without performing the operation of step S108.

In the next step S110, whether or not to perform decoration (color decoration) of coloring the surface of the shaped object 50 is determined on the basis of, for example, an instruction from the user (S110). In a case where the color decoration is performed (S110: Yes), the operation of the user regarding the color decoration is accepted (S112), and the process proceeds to the next step S114. In a case where the color decoration is not performed (S110: No), the process proceeds to the next step S114 without performing the operation of step S112.

Then, in the next step S114, whether or not to perform decoration (image decoration) of drawing an image on the surface of the shaped object 50 is determined on the basis of, for example, an instruction from the user (S114). In a case where the image decoration is performed (S114: Yes), the operation of the user regarding the image decoration is accepted (S116), and the process proceeds to the next step S118. In a case where the image decoration is not performed (S116: No), the process proceeds to the next step S118 without performing the operation of step S116.

Then, whether or not the operation for decoration by the user has ended is determined in the next step S118 (S118). In a case where it is determined that the operation has not ended (S118: No), the process returns to step S106, and the subsequent operations are repeated. In a case where it is determined that the operation has ended (S118: Yes), the process proceeds to the next step S120.

In the next step S120, whether or not to start the execution of shaping is determined on the basis of, for example, an instruction from the user (S120). Then, the process waits by repeating such determination until the timing to start the execution of shaping (S120: No). Furthermore, in a case where it is determined to start the execution of shaping (S120: Yes), the shaping device 12 is caused to execute the operation of shaping (S122).

In a case where determination is made not to perform the surface decoration (S104: No) in step S104 of determining whether or not to perform the surface decoration, the process proceeds to step S124 of performing the operation similar to step S120 without performing the operation related to the surface decoration. Then, in step S124, the process waits until the timing to start the execution of shaping (S124: No) and in a case where it is determined to start the execution of shaping (S124: Yes), the shaping device 12 is caused to execute the operation of shaping (S122).

According to the above configuration, for example, the control PC 14 can appropriately perform the processing for surface decoration. Furthermore, the shaped object 50 on which surface decoration has been applied thus can be appropriately shaped in the shaping device 12.

In the present example, the emboss decoration, the color decoration, and the image decoration are performed, as described above, as the surface decoration on the shaped object 50. With respect to color decoration and the image decoration of such decorations, each part of the coloring region 158 can be realized by using inks of various colors, for example, at the time of forming the coloring region 158 (see FIG. 2(a) and FIG. 2(b)) in the shaped object 50. In this case, the shape itself of the shaped object 50 to be shaped may be, for example, the same as the shape indicated by the three-dimensional data before setting the surface decoration.

On the other hand, in the case of performing the emboss decoration, the fine shape of the surface of the shaped object 50 is changed from the shape indicated by the three-dimensional data before setting the surface decoration. In this case, various methods can be considered for a specific method of forming irregularities in the emboss-processed form.

FIG. 6(a) to FIG. 6(d) are views explaining a specific method of performing the emboss decoration. In FIG. 6(a) to FIG. 6(d), an example of a case of performing shaping through the inkjet head method with the resolution of shaping set to 600 dpi with respect to the thicknesses of each layer and the depth of the emboss constituting the shaped object 50 is shown. For each minimum value to be explained below, the value becomes smaller when shaping is performed at higher resolution. Furthermore, the value becomes larger when shaping is performed at lower resolution.

Figure 6A:
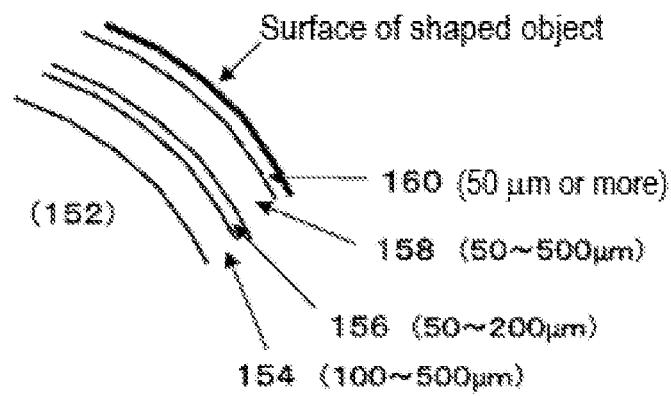
FIG. 6(a) to FIG. 6(d) are views explaining a specific method of performing emboss decoration.

FIG. 6(a) shows an example of the configuration (layer configuration) of the shaped object 50 in the case where the emboss decoration is not performed (no emboss). As described above using FIG. 2(a) and FIG. 2(b) and the like, in the present example, the shaping system 10 (see FIG. 1(a) and FIG. 1(b)) has, for example, the light reflecting region 154, the separating region 156, the coloring region 158, and the protective region 160 formed at the periphery of the interior region 152 configuring the interior of the shaped object 50. Then, in a case where the emboss decoration is not performed, the thickness of the light reflecting region 154 is set to, for example, about 100 µm to 1000 µm (preferably about 250 µm to 1000 µm, and more preferably about 250 µm to 500 µm). Furthermore, the thickness of the separating region 156 is set to, for example, about 50 µm to 200 µm (preferably about 100 µm to 200 µm). The thickness of the coloring region 158 is set to, for example, about 50 µm to 500 µm (preferably about 150 µm to 400 µm). Moreover, the thickness of the protective region 160 is set to, for example, about 50 µm or more. Furthermore, for example, the protective region 160 may be omitted.

In addition, in the case of performing the emboss decoration, the thickness is changed in accordance with the shape of the irregularities formed according to the emboss pattern for at least some layers constituting the shaped object 50. Furthermore, in this case, the layer in which the thickness is to be changed is not limited to a specific layer, and it is conceivable to change the thickness of various layers.

Figure 6B:
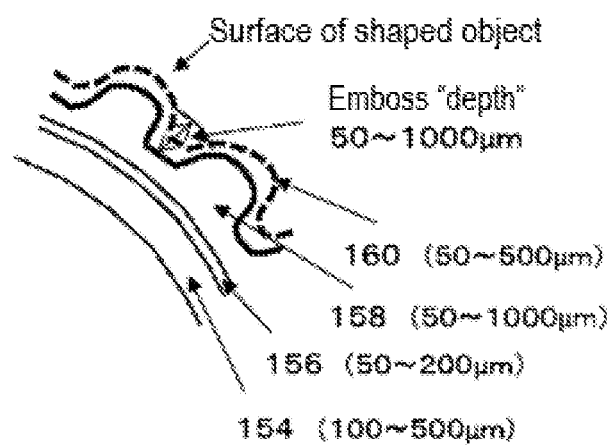
Figure 6C:
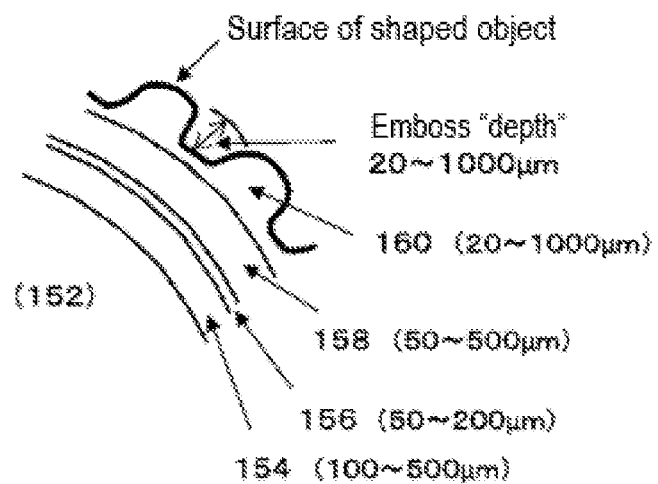
Figure 6D:
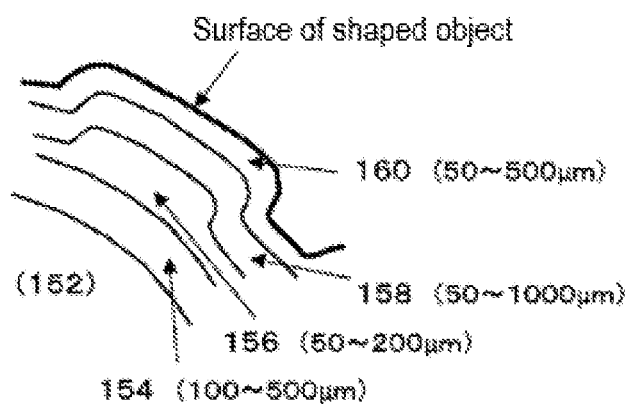

FIGS. 6(b) to 6(d) show an example of a specific method of forming irregularities of emboss-processed form in the case of performing the emboss decoration. FIG. 6(b) shows an example of a case where the irregularities in the emboss decoration are formed only in a coloring region 158. In this case, the surface data processor 304 (see FIG. 3) in the control PC 14 generates the decorated shaped object data indicating a structure in which the thickness at each position of the coloring region 158 changes according to the emboss pattern based on, for example, the decoration data and the three-dimensional data. Furthermore, the shaping device 12 (see FIG. 1(a) and FIG. 1(b)) shapes the shaped object 50 on which emboss decoration has been applied by performing the shaping based on such decorated shaped object data.

In this case, the way the color of the surface of the shaped object 50 is seen changes, for example, according to the depth of the emboss. Therefore, when further performing the color decoration, the image decoration, and the like on the surface of the shaped object 50, the respective decoration is preferably carried out in view of such change in color. In addition, in FIG. 6(b), the layer configuration indicated by the solid line shows an example of a configuration in the case where the protective region 160 is not formed. Furthermore, in the case of forming the protective region 160, for example, the protective region 160 having a constant thickness is formed in a state of lying along the irregularities of the emboss formed in the coloring region 158 as indicated by a broken line in the figure.

In this case, the thicknesses of the light reflecting region 154 and the separating region 156 can, for example, be considered to be similar to the case where the emboss is not provided as shown in FIG. 6(a). Furthermore, for example, when the depth of the irregularities of the emboss is about 50 to 1000 µm, the thickness of the coloring region 158 is set to, for example, about 50 to 1000 µm. In the case of forming the protective region 160, the thickness of the protective region 160 is set to, for example, about 50 to 500 µm.

The irregularities of the emboss may be formed in a layer on the outer side than the coloring region 158. FIG. 6(c) shows an example of a case where the irregularities in the emboss decoration are formed only in a protective region 160. In this case, the surface data processor 304 in the control PC 14 generates the decorated shaped object data indicating a structure in which the thickness at each position of the protective region 160 changes according to the emboss pattern based on, for example, the decoration data and the three-dimensional data. Furthermore, the shaping device 12 shapes the shaped object 50 on which the emboss decoration has been applied by performing shaping based on such decorated shaped object data. Moreover, in this case, the way the color of the surface of the shaped object 50 is seen does not change according to the depth of the emboss. Therefore, in this case, the tactual sense can be changed by the emboss decoration without largely changing the way the shaped object 50 is seen.

Furthermore, in this case, the thicknesses of the light reflecting region 154, the separating region 156, and the coloring region 158 can be considered to be similar to the case where the emboss is not provided shown in, for example, FIG. 6(a). Furthermore, for example, in a case where the depth of the irregularities of the emboss is about 20 to 1000 µm, the thickness of the protective region 160 is set to, for example, about 20 to 1000 µm.

Furthermore, it is conceivable to form the irregularities of the emboss in a layer on the inner side than the coloring region 158. FIG. 6(d) shows an example of a case where the irregularities in the emboss decoration are formed in a region on an inner side of the coloring region 158. In this case, the surface data processor 304 in the control PC 14 generates the decorated shaped object data indicating a structure in which the thickness at each position in the region on the inner side than the coloring region 158 changes according to the emboss pattern based on, for example, the decoration data and the three-dimensional data. Furthermore, the shaping device 12 shapes the shaped object 50 on which the emboss decoration has been applied by performing shaping based on such decorated shaped object data.

More specifically, in FIG. 6(d), an example of a case where the thickness of each position is changed in accordance with the emboss pattern for the separating region 156 formed on the inner side than the coloring region 158 is shown. In this case, the thicknesses of the light reflecting region 154 and the coloring region 158 can, for example, be considered to be similar to the case where the emboss is not provided shown in FIG. 6(a). Furthermore, the thickness of the protective region 160 can be considered to be similar to, for example, the case shown in FIG. 6(b). In addition, it is conceivable that the thickness of the separating region 156 is set to, for example, about 50 to 1000 µm, according to the depth of the irregularities of the emboss.

Even in such a configuration as well, change by the depth of the emboss does not occur in the way the color of the surface of the shaped object 50 is seen. In this case, the thickness in the normal direction of the coloring region 158 is preferably adjusted so as to have a constant thickness in consideration of the irregularities formed on the inner side than the coloring region 158.

Here, how to form the irregularities as shown in FIGS. 6(b) to 6(d) may be selected according to, for example, the dimensions of the irregularity to form. For example, when the dimension of the emboss is small, it is conceivable to form a transparent protective region 160 on the outermost surface of the shaped object 50, and for example, as shown in FIG. 6(c), form irregularities within a range of thickness of one layer such as the protective region 160. In addition, in the case where the dimension of the emboss is small and it is desired to change the way the color of the surface of the shaped object 50 is seen according to the depth of the emboss and the like, for example, as shown in FIG. 6(b), the irregularity is preferably formed within the range of thickness of the coloring region 158.

Furthermore, in a case where the dimension of the irregularities of the emboss is large, for example, as shown in FIG. 6(d) and the like, the irregularities are formed on the inner side than the coloring region 158, and the region of the surface including the coloring region 158 and the like is preferably formed along the irregularities. Thus, for the emboss, the configuration shown in FIG. 6(d) can also be said as being more suited to a case of forming large irregularities and deep irregularities as compared with the case shown in, for example, FIGS. 6(b) and 6(c).

In addition, the method of forming irregularities on the inner side than the coloring region 158 is not limited to the case shown in FIG. 6(d), and for example, it is conceivable to form irregularities by changing the thicknesses of the light reflecting region 154 and the interior region 152. In this case, the thickness of the interior region 152 means, for example, the distance from the center of the shaped object 50 to the surface in contact with the light reflecting region 154 in the interior region 152. Even in such a configuration, irregularities of the emboss can be appropriately formed.

Subsequently, supplementary explanation and explanation of alternative embodiments will be made with respect to the features of the shaping system 10 of the present example. First, supplementary explanation and the like will be made regarding the features of the shaping system 10.

As described above as well, according to the present example, decoration indicated by the decoration data can be appropriately applied on the shaped object 50 having the shape indicated by the three-dimensional data. Thus, the shaped object 50 on which various decorations have been applied can be appropriately shaped without, for example, greatly increasing the burden on the user.

Furthermore, in this case, applying the decoration to the shaped object 50 means, for example, coloring the surface of the shaped object 50 or changing the fine shape of the surface of the shaped object 50 to change the texture of the surface, and the like. Furthermore, in this case, coloring the surface of the shaped object 50 means performing coloring on the surface by, for example, shaping at least a part of the surface using ink for coloring. Moreover, in this case, for example, it is conceivable to draw an image on the surface of the shaped object 50 by coloring the surface of the shaped object 50 with a plurality of colors. In addition, changing the texture of the surface means, for example, changing the degree of roughness of the surface or the like. In this case, it is conceivable to, for example, perform the emboss decoration described above to form fine irregularities of emboss-processed form on at least a part of the surface of the shaped object 50 and change the texture. In addition, for example, at least a part of the surface of the shaped object can be finished into a non-specular surface form by forming fine irregularities.

Figure 7A:
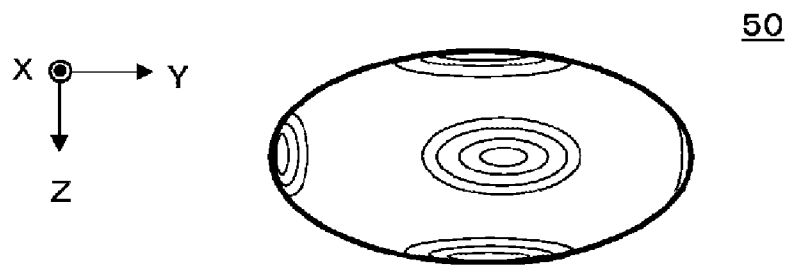
FIG. 7(a) to FIG. 7(c) are views explaining the features of the shaping system 10 in more detail.
Figure 7B:
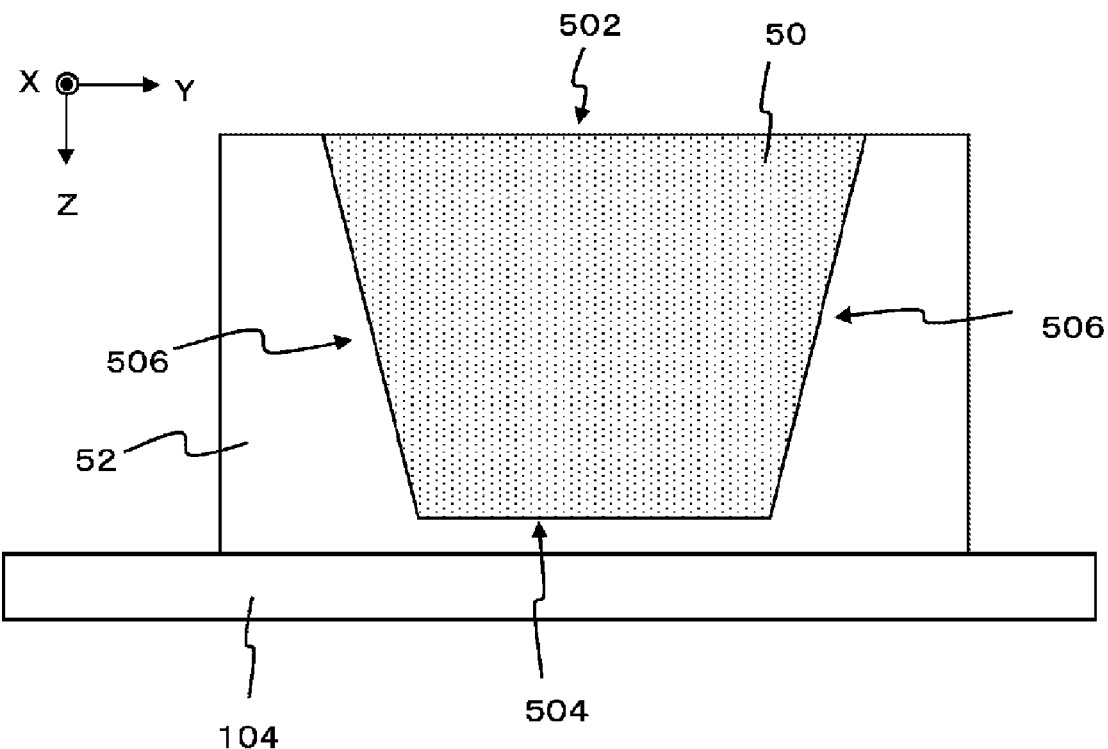
Figure 7C:
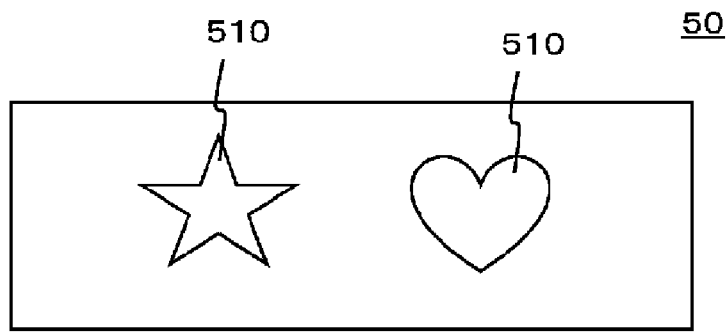

FIG. 7(a) to FIG. 7(c) are views explaining the features of the shaping system 10 in more detail. FIG. 7(a) is a view explaining the effect of performing the emboss decoration, and shows an example of a state of the shaped object 50 having a rugby ball shape shaped without performing the emboss decoration or the like. As in the shaping system 10 of the present example, in a case where the shaping is carried out by a layered shaping method using an inkjet head, if the shaping is simply performed, layering stripes that look like contour lines may appear on the surface of the shaped object 50, as shown in the figure, for example, due to the influence of the end of every layer of the layered layers of inks being overlapped in the layering direction (Z direction). Similarly, a stripe pattern may appear also in the main scanning direction (Y direction) and the sub-scanning direction (X direction). These stripe patterns lower the quality of the outer appearance particularly in the case of performing shaping including a gradual inclined surface or in the case of performing full color shaping.

In contrast, in the present example, the texture of the surface of the shaped object 50 can be appropriately changed by performing the emboss decoration on the surface of the shaped object 50. In addition, a color (identification color) identified by an observer can also be appropriately changed according to a desired color. Accordingly, for example, the shaping can be carried out under the condition that the unintended striped patterns such as the layering stripes appearing on the surface of the shaped object 50 are not easily noticeable. Therefore, according to the present example, the desired decoration can be performed on the shaped object 50 and the influence of the layering stripes and the like can be appropriately suppressed. Furthermore, in the present example, not only the impression in a case where the shaped object 50 is observed, for example, but also the feeling felt when touching the shaped object 50 can be changed in relation to the texture of the surface by performing the emboss decoration. Therefore, according to the present example, for example, the shaped object 50 in which the desired feeling can be obtained can be appropriately shaped. Further, in this case, for example, stains due to fingerprints may attach to the shaped object by forming the surface of the shaped object 50 into an irregular form.

Furthermore, for example, it is conceivable to perform the emboss decoration to reduce the difference in angle of the shaping surface with respect to the texture of the surface of the shaped object 50. In this case, the texture of the surface of the shaped object 50 means, for example, a rough feeling or a glossy feeling of the surface, or the like.

FIG. 7(b) is a view explaining the texture of the surface of the shaped object 50. When performing shaping by the layered shaping method using an inkjet head, a difference may occur in the texture of the surface such as roughness between an upper surface 502 and a lower surface 504 and a side surface 506 of the shaped object 50. More specifically, in a case of layering layers of ink in the layering direction (Z direction), the surface becomes flat due to the influence of spreading (leveling) of ink dots in the upper surface 502 and the lower surface 504, which are horizontal surfaces (XY planes) perpendicular to the layering direction, and such surfaces visually become glossy surfaces. Furthermore, the upper surface 502 of the shaped object 50 becomes flatter by flattening with the flattening roller. On the other hand, in the side surface 506, since the surface is formed at the end of every layer, roughness occurs by the formation of fine irregularities, which visually becomes a frosted surface. Furthermore, the side surface 506 also tends to be frosted even by the influence of contacting the support layer 52 at the time of shaping. As a result, a difference in texture occurs between the side surface 506 and the upper and lower surfaces in the shaped object 50. However, if such a difference in texture occurs, the appearance of the shaped object 50 degrades, and the quality of the shaped object 50 may lower in some cases.

On the other hand, in the present example, for example, it is conceivable to perform the emboss decoration on the upper surface 502 and the lower surface 504 in accordance with the state of the side surface that becomes a frosted state to make the upper surface 502 and the lower surface 504 frosted surfaces. In this case, the frosted surface means, for example, a surface in which the glossiness is reduced than when the irregularities are not formed by forming irregularities that affect the manner of reflection of light. Furthermore, the frosted surface, for example, can also be considered as a surface that is intentionally rendered non-glossy. More specifically, in this case, in the control PC 14 (see FIG. 1(*a*) and FIG. 1(*b*)), data indicating that at least a part of the horizontal surface such as the upper surface 502 or the lower surface 504 of the surface of the shaped object 50 is formed into a frosted state is used as the decoration data. In addition, the surface data processor 304 (see FIG. 3) in the control PC 14 generates the decorated shaped object data in which the state of the surface of the shaped object indicated by the three-dimensional data roughly changed on the basis of the emboss pattern set in advance with respect to a region indicated to be formed in a frosted state in the decoration data. In this case, roughly changing the state of the surface of the shaped object means, for example, making the state of the surface a rougher state. With this configuration, for example, the upper surface 502, the lower surface 504, and the like of the shaped object 50 can be brought closer to the frosted state in the side surface 506.

Furthermore, in this case, a region in which at least a state is roughly changed in the upper surface 502 and the lower surface 504 is preferably formed in a state of making contact with the material of the support layer 52 at the time of execution of shaping in the shaping device 12. With this configuration, for example, the upper surface 502 and the lower surface 504 can be more appropriately formed in a frosted state. In addition, a large difference can be appropriately prevented from occurring in the state of the angle of the shaping surface with respect to the surface of the shaped object 50.

In the above description, the operation of forming the upper surface 502 and the lower surface 504 of the shaped object 50 in a frosted state has been mainly described for a case of being carried out based on the instruction from the user, similarly to a case of performing the normal emboss decoration. However, the operation of forming the upper surface 502 and the lower surface 504 in a frosted state may, for example, be automatically performed based on the three-dimensional data without receiving an instruction from the user. With this configuration, for example, the shaped object 50 in which the state of the surface is homogeneous can be more easily shaped.

Furthermore, in the above description, the emboss decoration, the color decoration, and the image decoration have been mainly described as the decoration performed on the shaped object 50. According to the present example, for example, even in the case of using three-dimensional data or the like in which specification of decoration on the surface is not made, surface decoration such as roughness, color, image, and the like can be appropriately applied by simple operation. Moreover, the decoration performed on the shaped object 50 is not limited to the decoration described above, and it is conceivable to carry out various other decorations. FIG. 7(*c*) shows another example of the decoration performed on the shaped object 50.

In the case shown in FIG. 7(*c*), a decoration of attaching a gold foil or the like to a region 510 of a part of the shaped object 50 is performed as the decoration on the shaped object 50. In this case, the gold foil or the like is an example of a thin film for decoration to be attached to the shaped object 50.

Furthermore, in this case, a configuration capable of ejecting a material that becomes sticky (adhesive) on the surface of the shaped object 50 is used as the configuration of the shaping device 12 (see FIG. 1(*a*) and FIG. 1(*b*)). More specifically, in this case, it is conceivable to use, for example, a primer ink or the like as a material that becomes sticky. Furthermore, in this case, the head portion 102 (see FIG. 1(*a*) and FIG. 1(*b*)) of the shaping device 12 includes an inkjet head for primer ink. Moreover, the shaping device 12 is formed of primer ink for a region 510 of one part in the surface of the shaped object 50 under the condition that it becomes sticky at the timing of attaching at least a gold foil or the like.

In this case, the attachment of the gold foil or the like is performed, for example, after the operation of shaping the shaped object 50 by the shaping device 12 is completed. In this case, the shaped object 50 is decorated, for example, by attaching the gold foil or the like on the region 510 formed with the primer ink.

With this configuration, for example, the region 510 to which the gold foil or the like is attached can be appropriately set with higher accuracy compared with a case of separately applying an adhesive or the like to the surface of the shaped object 50 after the shaping of the shaped object 50. Furthermore, the decoration of the shaped object 50 can be more appropriately carried out with high accuracy by setting the regions 510 of various shapes. Moreover, in this case, the post-process performed after removing the shaped object 50 from the shaping device 12 can be more simplified, for example, compared to the case of applying an adhesive or the like after the shaping of the shaped object 50. Therefore, with such a configuration, for example, the decoration of attaching the gold foil or the like can be performed more simply and with high accuracy.

Furthermore, a specific method of shaping the shaped object 50 and how to decorate the shaped object 50 are not limited to the methods described above, and various other methods may be used. For example, in the above description, the method of shaping the shaped object 50 has been described mainly for a case of performing shaping by the inkjet method using an ultraviolet curable ink. However, it is conceivable to use, for example, thermoplastic ink or the like as the material of the shaped object 50. The thermoplastic ink is, for example, an ink that cures by being cooled to room temperature after being ejected from an ejection head such as an inkjet head. Furthermore, for example, it is conceivable to use a configuration of ejecting the material by a method other than the inkjet method for the ejection head for ejecting the material of the shaped object 50. Moreover, for example, it is conceivable to use an optical shaping method or the like as a method of shaping. In this case, the optical shaping method is, for example, a method of performing shaping by irradiating a liquid surface of a liquid layer filled with a light curable ink with a laser beam. In this case, for example, each layer constituting the shaped object 50 is cured by irradiating with a laser beam in a pattern corresponding to the shaped object to be shaped. In such a case as well, the decorated shaped object data based on the three-dimensional data and the decoration data is generated, and laser light irradiation or the like is performed on the basis of the decorated shaped object data, whereby the emboss decoration and the like can be appropriately carried out.

In the above description, an example of the operation of forming the surface of the shaped object 50 into a frosted state has been described with reference to FIG. 7(b) and the like. Furthermore, regarding such a method, for example, it has been explained that the upper surface and the lower surface are formed into a frosted surface by performing emboss decoration on the upper surface and the lower surface of the shaped object 50. Hereinafter, the method of making the surface of the shaped object 50 into a frosted state will be described in more detail.

Figure 8:
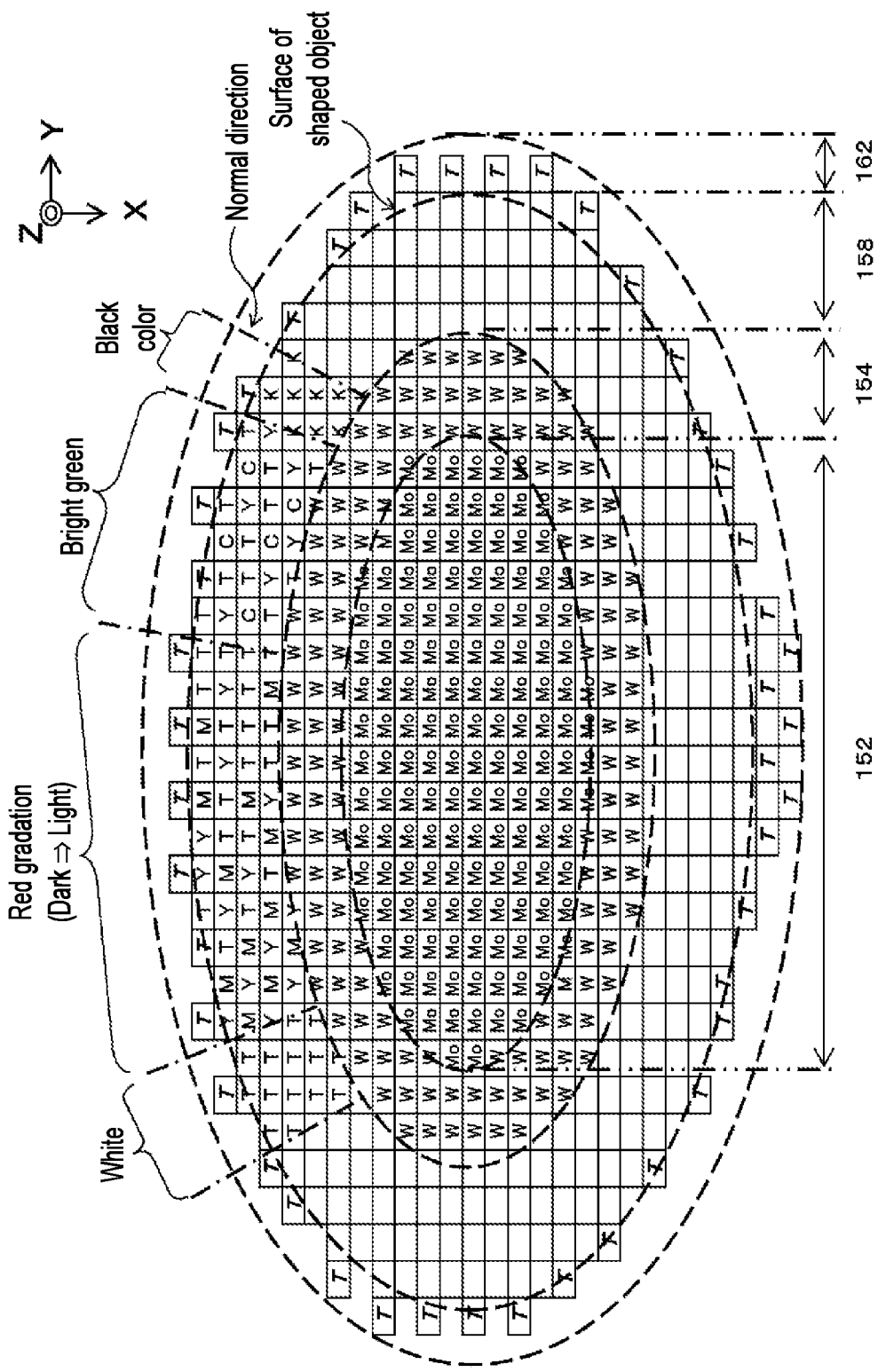
FIG. 8 is a view explaining an alternative embodiment of the shaped object 50.

FIG. 8 is a view explaining an alternative embodiment of the shaped object 50, and shows an example of the configuration of the shaped object 50 when the surface is formed in a frosted state by a cross-sectional view. Other than the points described below, in FIG. 8, the configuration denoted with the same reference number as FIGS. 1(a) to 7(c) may have a feature same as or similar to the configuration in FIGS. 1(a) to 7(c).

In the present alternative embodiment, the shaped object 50 includes the interior region 152, the light reflecting region 154, the coloring region 158, and a matte region 162. The interior region 152, the light reflecting region 154, and the coloring region 158 are regions having features same as or similar to the interior region 152, the light reflecting region 154, and the coloring region 158 in the shaped object 50 shown in FIG. 2. Further, in the shaped object 50 of the present alternative embodiment, the matte region 162 is a region formed on the outermost side of the shaped object 50 in place of the protective region 160 (see FIG. 2(a) and FIG. 2(b)) in the shaped object 50 shown in FIG. 2(a) and FIG. 2(b).

Furthermore, in the present alternative embodiment, the shaping of the shaped object 50 is carried out, for example, by using the head portion 102 (see FIG. 2(a) and FIG. 2(b)) shown in FIG. 2(a) to eject the ink to become the material of the shaped object 50 from in each inkjet head in the head portion 102. Furthermore, in this case, each inkjet head ejects ink to a position set according to the resolution of shaping, thereby forming ink dots corresponding to voxels, which is the minimum unit of shaping. Moreover, in FIG. 8, an example of a voxel configuration of each region on a cross-section (sliced plane) is shown by showing each voxel constituting the shaped object 50 in a grid form. The color of the ink dot to be formed at the relevant position is also shown with respect to the position of each voxel. In this case, one square in the figure represents one voxel. Furthermore, in this case, one voxel corresponds to data (one piece of data) of one position in the decorated shaped object data. Therefore, one square in the figure can be considered as showing data of one position in the decorated shaped object data. For example, one square in the figure may be caused to correspond to data of a plurality of voxels or a plurality of positions in the decorated shaped object data depending on the specifications and the like of the decorated shaped object data.

More specifically, in this case, dots of the shaping material ink (Mo ink) are formed at each position constituting the interior region 152 based on the arrangement (specification) of the data in the decorated shaped object data. Furthermore, at each position constituting the light reflecting region 154, dots of white (W color) ink are formed based on the arrangement of data in the decorated shaped object data. Moreover, dots of ink selected from the ink of each color of YMCK and the clear ink of transparent color (T color) are formed at each position in the coloring region 158 in accordance with the color to be colored at each position based on the arrangement of data in the decorated shaped object data. In this case, the color of the ink dot to be formed at each position constituting the coloring region 158 is determined by, for example, handling the data showing the cross-section of the shaped object 50 as two-dimensional surface data and arranging data indicating each color of YMCK and T color in the coloring region 158 by error diffusion method or the like. More specifically, in this case, for example, the position where dots of ink of each color of YMCK are to be formed is first determined. Then, the formation of dots of ink in T color is specified with respect to a position (data position where each color of YMCK is not specified) where dots of ink of each color of YMCK inks are not formed in the coloring region 158. With this configuration, for example, change in thickness and shape of the coloring region 158 can be prevented from occurring due to the color to be colored, and coloring can be appropriately performed on each position of the coloring region 158 while maintaining the surface shape of the shaped object 50.

Furthermore, in the case shown in FIG. 8, the coloring region 158 includes a white portion, a red gradation portion, a bright green portion, and a black portion. In this case, the white portion in the coloring region 158 means, for example, a portion colored white in the surface of the decorated shaped object data. It is also conceivable that the white portion is formed so as to be filled with only the clear ink of T color as shown in the figure, for example. With such a configuration, for example, white coloring can be appropriately performed by making the color of the light reflecting region 154 on the inner side than the coloring region 158 visible from the outer side of the shaped object 50. Furthermore, in the coloring region 158, it is conceivable to form the red gradation portion by using inks of Y color, M color, and T color. In this case, gradation-like coloring can be performed by gradually changing the proportion of the position to form with the T color ink. Moreover, it is conceivable to form the bright green portion using inks of Y color, C color, and T color. It is also conceivable to form the black portion using ink of black color (K color).

Furthermore, as described above, the matte region 162 is a region formed on the outermost side of the shaped object 50, and is formed at the periphery of the coloring region 158 using, for example, clear ink. More specifically, in the present alternative embodiment, the matte region 162 is formed into a mat form by decimating some voxels so as to be formed to an irregular form. In this case, decimating some voxels means that ink dots are formed only at positions of some voxels in the region along the surface of the shaped object 50, for example, as shown in the figure. In addition, in this case, the matte region 162 is formed into a matte state by not forming dots at positions of some voxels so as to be a discontinuous layer.

For example, the state of the surface of the shaped object 50 can be formed into a frosted state by forming such a matte region 162 on the surface of the shaped object 50. In FIG. 8, an example of a configuration of the shaped object 50 for a case of forming the matte region 162 on the entire surface of the shaped object 50 is illustrated. However, in a further alternative embodiment of the configuration of the shaped object 50, for example, the matte region 162 may be formed only on a part of the surface of the shaped object 50. With such a configuration, for example, the decoration to obtain the frosted state can be appropriately performed on a desired position in the surface of the shaped object 50.

The specific structure of the shaped object 50 is not limited to the configuration described above and may be further modified. For example, in a further alternative embodiment of the configuration of the shaped object 50, a separating region may be further formed between the light reflecting region 154 and the coloring region 158, similarly to the shaped object 50 shown in FIG. 2(a) and FIG. 2(b). Furthermore, a protective region may be further formed on the outer side of the coloring region 158, similarly to the shaped object 50 shown in FIG. 2(a) and FIG. 2(b). In this case, it is conceivable to form the matte region 162 on a further outer side of the protective region. Such a configuration, for example, can be considered as a configuration in which a transparent region is further formed between the coloring region 158 and the matte region 162. Furthermore, in this case, for example, a region including a region having a predetermined thickness that functions as a protective region can be considered as the matte region 162.

Figure 9A:
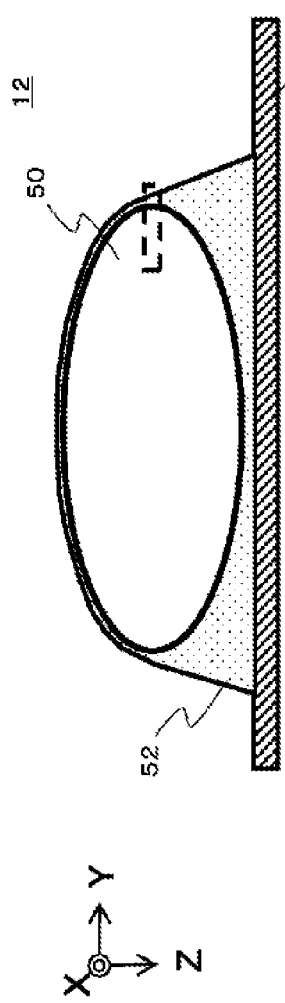
FIG. 9(a) and FIG. 9(b) are views explaining in further detail the operation of shaping the shaped object 50 including a matte region 162.
Figure 9B:
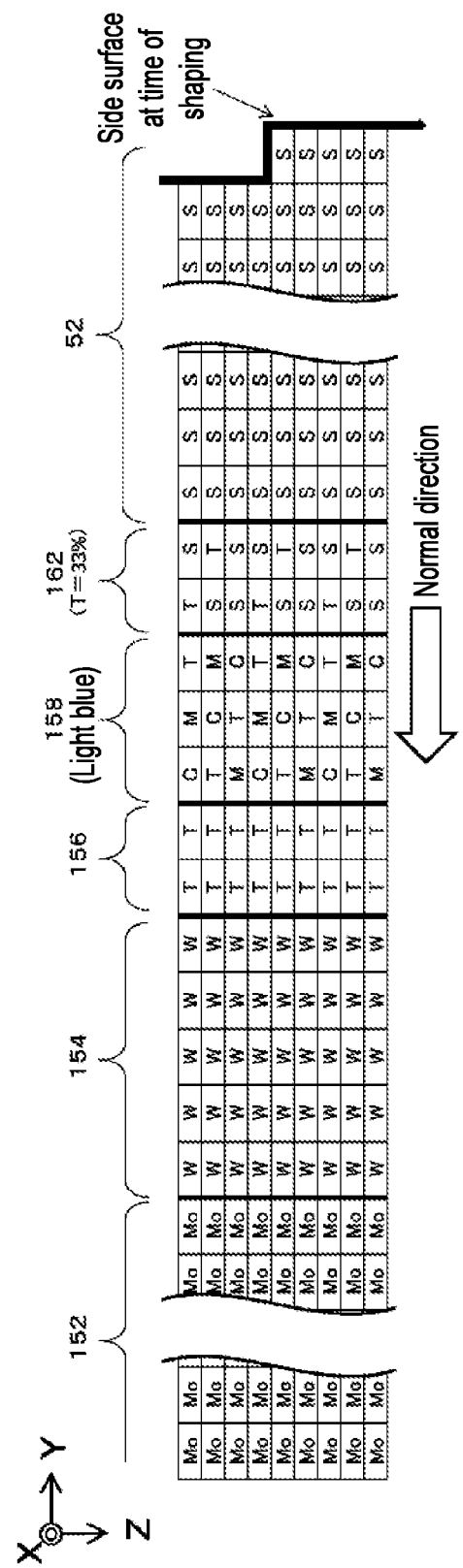

Subsequently, the operation of shaping the shaped object 50 including the matte region 162 will be described in more detail. FIG. 9(a) and FIG. 9(b) are views explaining the operation of shaping the shaped object 50 including the matte region 162 in further detail. FIG. 9(a) shows a state of shaping the shaped object 50 in the shaping device 12 in a simplified manner. FIG. 9(b) is a view schematically showing voxels constituting a part of the shaped object 50, and shows a configuration of the voxels in the portion indicated by the broken line in FIG. 9(a) in a simplified manner.

Also in the case of shaping the shaped object 50 including the matte region 162, the operation of shaping the shaped object 50 can be performed by a normal shaping device 12. More specifically, in this case as well, the shaped object 50 can be shaped by using the shaping device 12 described with reference to FIG. 1(a) and FIG. 1(b) and the like. Furthermore, in this case, as shown in the figure, the shaped object 50 is shaped while forming the support layer 52 at the periphery of the shaped object 50 as necessary on the shaping table 104.

Moreover, in this case, the shaping device 12 shapes the shaped object 50 including the matte region 162 by performing shaping based on the decorated shaped object data provided from the control PC 14. Furthermore, in the control PC 14, the decorated shaped object data is generated based on the three-dimensional data and the decoration data same as or similarly to the control PC 14 described with reference to, for example, FIG. 3. In this case, as the three-dimensional data, for example, three-dimensional data not including information on irregularities constituting the matte region 162 and the like is used. Furthermore, as the decoration data, data specifying the formation of the matte region 162 is used. The decoration data specifying the formation of the matte region 162 means, for example, data indicating to form at least a part of the surface of the shaped object 50 into a matte state.

More specifically, in this case, for example, the control PC 14 further includes a configuration that performs processing related to the formation of the matte region 162, in addition to the configuration shown in FIG. 3. Furthermore, in this case, the pattern selector 310 and the emboss pattern memory 312 (see FIG. 3) in the control PC 14 may also be configured to perform processing related to the formation of the matte region 162. Moreover, the control PC 14 generates the decorated shaped object data indicating the shaped object 50 in which the matte region 162 is formed in at least one part of the surface of the shaped object 50 on the basis of the three-dimensional data and the decoration data in the surface data processor 304 (see FIG. 3). In addition, in this case, the matte region 162 is formed by placing dots of clear ink at discrete positions (voxel positions) in the voxel unit (droplet unit) in the outermost layer of the shaped object 50. Furthermore, dots of ink (support ink) that becomes a material of the support layer 52 are disposed between dots of clear ink constituting the matte region 162 (portion where no dot of clear ink is disposed). With such a configuration, for example, the matte region 162 can be appropriately formed by removing the support layer 52 after the completion of shaping.

Here, it is conceivable to form each region of the shaped object 50 and each voxel constituting the support layer 52, for example, as shown in FIG. 9(b). The configuration of the voxel shown in FIG. 9(b) is an example of the configuration of the voxels at the time point before the removal of the support layer 52. Furthermore, in FIG. 9(b), for the sake of convenience of explanation, an example of the configuration of the voxels is shown for the shaped object 50 in the case where the separating region 156 is formed between the light reflecting region 154 and the coloring region 158. The coloring region 158 shows the configuration of voxels in a case of coloring in light blue.

In addition, in this case, at the time point before the removal of the support layer 52, the matte region 162 is constituted by voxels (T) corresponding to dots formed of clear ink and voxels (S) corresponding to dots formed by support ink. In the case shown in the figure, the matte region 162 is formed so that the area occupancy of the clear ink in the final matte region 162 becomes 33%. In this case, the area occupancy of the clear ink becoming 33% means that the area occupancy of the clear ink becomes 33% after the removal of the support layer 52. Furthermore, in the present alternative embodiment, the area occupancy of the clear ink in the matte region 162 is 33% also at a time point before the removal of the support layer 52. In this case, the area occupancy of the clear ink in the matte region 162 being 33% at a time point before the removal of the support layer 52 means that with respect to the voxels constituting the region corresponding to the matte region 162, one out of every three voxels is a voxel corresponding to clear ink, as shown in the figure. In this case, the voxel corresponding to the support ink is eliminated by removing the support layer 52, and the matte region 162 of irregular form in units of voxels is formed on the surface of the shaped object 50.

The state after the support layer 52 is removed will now be described in more detail. FIG. 10(a) and FIG. 10(b) are views explaining a state after removing the support layer 52. FIG. 10(a) shows an example of a state after the support layer 52 is removed from the state shown in FIG. 9(b).

In a case where the support layer 52 is removed from the state shown in FIG. 9(b), among the voxels of clear ink constituting the region corresponding to the matte region 162 in FIG. 9(b), only the voxels in contact with the coloring region 158 are left unremoved, and the voxels not in contact with the coloring region 158 are removed together with the support layer 52. Therefore, the state after the removal of the support layer 52 becomes, as shown in FIG. 10(a), a state in which convex portions formed of clear ink are discretely formed in a portion in contact with the coloring region 158. In this case, the surface of the shaped object 50 (final shaped object) after the completion of shaping is in the matte state that diffusely reflects light. More specifically, in the case shown in the figure, the convex portions in units of voxels are formed with clear ink by 33% of the surface of the coloring region 158. With this configuration, for example, the matte region 162 can be formed at the desired position in the surface of the shaped object 50, and the way the surface of the shaped object 50 is seen can be appropriately adjusted. Furthermore, for example, an unintended difference in glossiness or the like can be appropriately prevented from occurring by the angle of the outer circumferential surface of the shaped object 50.

Here, in the shaped object 50, the light reflecting region 154, the separating region 156, the coloring region 158, and the matte region 162 are preferably formed such that the thicknesses in the normal direction with respect to the surface of the shaped object 50 becomes constant. In this case, the thickness being constant may be, for example, being constant within a predetermined allowable range. Furthermore, in this case, it is conceivable to set the thicknesses of the light reflecting region 154, the separating region 156, and the coloring region 158 to be the same as or similar to, for example, the configuration described with reference to FIG. 6(a). Moreover, it is conceivable to set the thicknesses of the interior region 152 and the support layer 52 to the thickness corresponding to the shape and the like of the shaped object 50. The thickness of the matte region 162 formed on the outermost surface of the shaped object 50 is preferably, for example, about 100 to 200 μm. With such a configuration, for example, the surface of the shaped object 50 can be appropriately formed into a matte state.

Regarding the thickness of each region, the relation with the number of voxels aligned in the normal direction is also important. For example, if the thickness of the separating region 156 is too thick, the resolution (substantial resolution in the way the color is seen) and color tone that are visually recognized with respect to the coloring region 158 may be adversely affected. Therefore, the separating region 156 is preferably formed so that, for example, the number of voxels aligned in the normal direction is about one to two. If the coloring region 158 is formed thick, the resolution that is visually recognized lowers, and if the coloring region is formed thin, the color expression region (gamut) narrows. Therefore, the coloring region 158 is preferably formed so that the number of voxels aligned in the normal direction is about 2 to 4. The matte region 162 is preferably formed so that the number of voxels aligned in the normal direction and an in-plane direction orthogonal to the normal direction is about one to two because roughness is conspicuous if the shape of irregularities is large. More specifically, in this case, the number of voxels constituting one convex portion is preferably one (1×1×1 voxel) or about two (1×1×2 voxels) to 8 (2×2×2 voxels) with the number of voxels aligned in each direction of X, Y, and Z set to about 1 to 2.

In FIG. 9(b), FIG. 10(a), and the like, in the case where a group of voxels in the surface continuing in the X and Y directions forms a layer (one layer) in the shaped object 50, the configuration of the voxels is shown in a simplified manner. Furthermore, with respect to the dimensions of each voxel, in a case where the dimension in the in-plane direction is larger at a ratio (e.g., Z:Y) of the dimension in the layering direction (Z direction) and the dimension in the in-plane direction (e.g., Y direction), a region corresponding to data (slice data) indicating the shape and the color of one cross-section in the shaped object 50 may be formed by a plurality of layers.

Supplementary explanation on the present alternative embodiment and description on a further alternative embodiment will now be described. First, supplementary explanation on the present alternative embodiment will be made. The operation of shaping carried out in the present alternative embodiment described with reference to FIG. 9(a), FIG. 9(b) and FIG. 10(a) can be considered as, for example, an operation of forming dots of ink for matting processing with respect to one part and not the entire surface of the outermost surface of the shaped object 50 in the case of shaping the shaped object 50 by the layered shaping method. More specifically, in the present alternative embodiment, the matte region 162 formed of ink for matting processing is formed with a constant thickness with respect to the normal direction of the outer surface of the shaped object 50. Furthermore, transparent clear ink is used as the ink for matting processing. Moreover, in this case, the matte region 162 can be considered as a region formed into a mat form with clear ink on the surface of the shaped object 50.

Furthermore, in this case, whether or not to perform the process of forming the matted region 162 (necessity of matting processing) is preferably selectable (settable) by the user. In this case, for example, it is conceivable to accept an instruction as to whether or not to perform the process of forming the matte region 162 by the user's operation on the control PC 14 (see FIG. 1(a) and FIG. 1(b)). In this case, the area occupancy of the matte region 162 is more preferably settable by the user. The area occupancy of the matte region 162 means, for example, a proportion occupied by the area of a portion formed into a convex form in the range where the matte region 162 is formed in the surface of the shaped object 50. Furthermore, the area of the portion formed to a convex form means, for example, a design area occupied by voxels constituting the convex portion.

Next, an alternative embodiment related to how to form the matte region 162 and the like will be described. FIG. 10(b) is a view explaining an alternative embodiment on how to form the matte region 162. In the above description, an example of a case where one convex portion is formed with one voxel has been mainly described for the portion of convex shape (convex portion) in the matte region 162. However, in a further alternative embodiment of the configuration of the shaped object 50, one convex portion may be formed by a plurality of voxels.

More specifically, in a case where the shape of each voxel has a shape having a large aspect ratio, a difference occurs in the shape of the convex portion by an angle of a plane in the surface of the shaped object 50, and consequently, a difference also occurs in the state of matted form. Therefore, it is conceivable to determine the number of voxels constituting one convex portion and the arrangement of voxels according to the aspect ratio of the voxel. For example, when the aspect ratio between the in-plane direction (X direction and Y direction) orthogonal to the layering direction and the layering direction (Z direction) is 2:1 (twice) in one voxel, it is conceivable to form one convex portion in the matte region 162 with two voxels (1×1×2 voxels) so that two voxels are aligned in the layering direction, as shown in FIG. 10(b). In such a configuration, since the width of one convex portion in the layering direction is twice as large as that of one voxel, the shape of each convex portion can be made closer to a cube. Furthermore, for example, the difference in the state of the matted form can be appropriately prevented from occurring due to the angle of the plane in the surface of the shaped object 50. Moreover, in the case shown in FIG. 10(b), the area occupancy of the clear ink in the matte region 162 is 50%.

In addition, in the above description, an example of a case where the matte region 162 is mainly formed of clear ink on the outer side of the coloring region 158 has been described. However, in a further alternative embodiment of the configuration of the shaped object 50, it is conceivable, for example, to make a part of the coloring region 158 also serve as the matte region 162. FIG. 11(a) and FIG. 11(b) are views describing a further alternative embodiment of the configuration of the shaped object 50. FIG. 11(*a*) is a view schematically showing voxels constituting a part of the shaped object 50 in the present alternative embodiment, and shows an example of a state before removing the support layer 52 at the time of shaping of the shaped object 50. FIG. 11(*b*) shows an example of a state in the vicinity of the matte region 162 after removing the support layer 52. Other than the points described below, in FIG. 11(*a*) and FIG. 11(*b*), the configurations denoted with the same reference numbers as FIGS. 1(*a*) to 10(*b*) may have features same as or similar to the configurations in FIGS. 1(*a*) to 10(*b*).

As described above, in a further alternative embodiment of the configuration of the shaped object 50, it is conceivable, for example, to make a part of the coloring region 158 also serve as the matte region 162. More specifically, it is also conceivable to shape the shaped object 50 so that the coloring region 158 is exposed on the outermost surface of the shaped object 50 depending on, for example, the quality demanded on the shaped object 50. In such a case, it is conceivable to have a part of the coloring region 158 also function as the matte region 162 by forming a portion on the outermost side in the coloring region 158 into an irregular form instead of separately forming the matte region 162 on the outer side of the coloring region 158. In this case, the matte region 162 becomes a region of one part of the coloring region 158, as in the configuration of the present alternative embodiment shown in FIG. 11(*a*) and FIG. 11(*b*). Furthermore, the matte region 162 is formed in at least a part of a portion exposed on the surface of the shaped object 50 in the coloring region 158.

Furthermore, in this case, a process of matting the outermost surface of the shaped object 50 (matting processing) is performed during the process of generating the decorated shaped object data in the control PC 14 (see FIG. 1(*a*) and FIG. 1(*b*)). In this matting processing, for example, some voxels in the outermost surface of the coloring region 158 are replaced with voxels of the support ink. With such a configuration, for example, the surface of the shaped object 50 can be formed into a state of a matted form that diffusely reflects light by decimating the voxels of the coloring region 158 so to speak instead of a method of increasing the voxels on the outer side of the coloring region 158.

More specifically, in this case, the outermost surface of the coloring region 158 becomes, for example, a state in which some voxels are replaced with voxels of the support ink, as shown in FIG. 11(*a*). Then, in this case, if the support layer 52 is removed after the completion of the shaping of the shaped object 50, irregularities are formed on the surface of the shaped object 50, for example, as shown in FIG. 11(*b*). Thus, in the present alternative embodiment as well, for example, the surface of the shaped object 50 can be appropriately formed into a matte state.

Here, in the case of forming the matte region 162 as in the present alternative embodiment, a part of the voxels of the ink for coloring (color ink) constituting the coloring region 158 disappears. However, the substantial resolution of the color tone and the way the color is seen in the final shaped object 50 is determined by the influence of many voxels. Therefore, even if the matte region 162 is formed as in the present alternative embodiment, the influence on the image quality and the like of the surface of the shaped object 50 can usually be ignored. Furthermore, in this case, when the number of voxels aligned in the normal direction in the coloring region 158 is increased as necessary and reaches a sufficiently large number, the influence of forming the matte region 162 can be further reduced. Furthermore, in a further alternative embodiment of the shaped object 50, it is conceivable to form the matte region 162 by methods other than the above. More specifically, for example, in the case where the surface is not colored and at least a part of the surface of the shaped object 50 is formed with white ink, it is also conceivable to use white ink or the like as the ink for matting processing.

INDUSTRIAL APPLICABILITY

The present invention can be suitably used in, for example, a shaping system.

The invention claimed is:
1. A shaping system that shapes a shaped object which is stereoscopic, and the shaping system comprising:
a three-dimensional data inputter, configured to accept an input of a three-dimensional data, which is data indicating at least a stereoscopic shape of the shaped object;
a surface data processor, configured to generate a decorated shaped object data, which is data indicating the shaped object on which decoration indicated by a decoration data has been applied, based on the decoration data which is data indicating decoration to be applied on at least a part of a surface of the shaped object and the three-dimensional data; and
a shaping executer, configured to execute a shaping operation of the shaped object based on the decorated shaped object data to shape the shaped object on which decoration indicated by the decoration data has been applied,
wherein the decoration data indicates that at least a part of the surface of the shaped object is formed to a frosted state,
wherein the shaping executer comprises an inkjet head that ejects a material of the shaped object,
the inkjet head ejects a material for shaping to a position set according to a resolution of shaping to form a dot of the material corresponding to a voxel, which is a minimum unit of shaping,
a decoration portion, that is decorated by the decoration data, is formed by a collection of a plurality of the voxels,
the decoration data is data indicating to form at least a part of the surface of the decoration portion into a matte state, and
the surface data processor generates the decorated shaped object data indicating the shaped object in which a matte region formed into a matte state by decimating parts of the voxels of the surface of the decoration portion is formed in at least a part of the surface of the decoration portion based on the decoration data and the three-dimensional data,
wherein an ink dot, that is a material of a support layer to be removed upon completion of the shaping, is disposed at a location at which the voxel is not decimated.
2. The shaping system as set forth in claim 1, wherein the shaped object is shaped by forming a plurality of layers of the material ejected from the inkjet head in an overlapping manner.
3. The shaping system as set forth in claim 1, further comprising:
a decoration specification acceptor, configured to accept a specification on how to perform decoration on at least a part of the surface of the shaped object from a user, wherein the decoration data indicates a decoration for forming irregularities of an emboss-processed form on the surface of the shaped object, and the decoration specification acceptor presents to the user a plurality of types of emboss patterns different from each other as an emboss pattern indicating a pattern of irregularities in the emboss-processed form and having the user select one of the emboss patterns to accept the specification on how to perform decoration from the user.

4. The shaping system as set forth in claim 3, wherein the shaping executer shapes the shaped object including:
an interior region, constituting an interior of the shaped object; and
a coloring region, formed of a material for coloring, and the coloring region being formed on an outer side of the interior region, and the surface data processor generates the decorated shaped object data indicating a structure in which a thickness at each position of the coloring region changes according to the emboss pattern based on the decoration data and the three-dimensional data.

5. The shaping system as set forth in claim 3, wherein the shaping executer shapes the shaped object including:
an interior region, constituting an interior of the shaped object;
a coloring region, formed of a material for coloring, and the coloring region being formed on an outer side of the interior region; and
an outer transparent region, formed of a material of a transparent color, and the outer transparent region being formed on an outer side of the coloring region, and the surface data processor generates the decorated shaped object data indicating a structure in which a thickness at each position of the outer transparent region changes according to the emboss pattern based on the decoration data and the three-dimensional data.

6. A shaping system that shapes a shaped object which is stereoscopic, and the shaping system comprising:
a three-dimensional data inputter, configured to accept an input of a three-dimensional data, which is data indicating at least a stereoscopic shape of the shaped object;
a surface data processor, configured to generate a decorated shaped object data, which is data indicating the shaped object on which decoration indicated by a decoration data has been applied, based on the decoration data which is data indicating decoration to be applied on at least a part of a surface of the shaped object and the three-dimensional data; and
a shaping executer, configured to execute a shaping operation of the shaped object based on the decorated shaped object data to shape the shaped object on which decoration indicated by the decoration data has been applied;

the shaping system further comprising:
a decoration specification acceptor, configured to accept a specification on how to perform decoration on at least a part of the surface of the shaped object from a user, wherein
the decoration data indicates a decoration for forming irregularities of an emboss-processed form on the surface of the shaped object, and the decoration specification acceptor presents to the user a plurality of types of emboss patterns different from each other as an emboss pattern indicating a pattern of irregularities in the emboss-processed form and having the user select one of the emboss patterns to accept the specification on how to perform decoration from the user, wherein the shaping executer shapes the shaped object including:
an interior region, constituting an interior of the shaped object; and
a coloring region, formed of a material for coloring, and the coloring region being formed on an outer side of the interior region, and the surface data processor generates the decorated shaped object data indicating a structure in which a thickness at each position of a region on an inner side than the coloring region changes according to the emboss pattern based on the decoration data and the three-dimensional data.

7. The shaping system as set forth in claim 1, wherein the decoration data indicates forming at least a part of a horizontal plane of the surface of the shaped object into a frosted state.

8. The shaping system as set forth in claim 1, wherein the surface data processor generates the decorated shaped object data in which a state of the surface of the shaped object indicated by the three-dimensional data is roughly changed with respect to a region indicated to be formed into a frosted state in the decoration data.

9. The shaping system as set forth in claim 8, wherein the shaping executer is capable of ejecting a material of a support layer that supports a periphery of the shaped object being shaped, and shapes the shaped object in a state where at least the material of the support layer is brought into contact with the region where the state is roughly changed.

10. The shaping system as set forth in claim 1, wherein the matte region is a region formed of a transparent color material on the surface of the shaped object.

11. The shaping system as set forth in claim 1, wherein the shaped object including a coloring region formed of a material for coloring in at least a part of the surface is shaped, and the matte region is a region of a part of the coloring region, and is formed in at least a part of a portion exposed on the surface of the shaped object in the coloring region.

12. The shaping system as set forth in claim 1, wherein the shaping executer is capable of ejecting a colored material for coloring, and the decoration data indicates a color for coloring with respect to at least a part of the surface of the shaped object.

13. The shaping system as set forth in claim 1, wherein the shaping executer is capable of ejecting materials for coloring of a plurality of colors different from each other, and the decoration data indicates an image to be drawn in a region using the materials for coloring of the plurality of colors with respect to at least a part of the surface of the shaped object.

14. The shaping system as set forth in claim 1, wherein the shaping executer is capable of ejecting a material that becomes sticky on the surface of the shaped object, the decoration data indicates a region formed with the material that becomes sticky for at least a part of the surface of the shaped object, and the shaped object is decorated by attaching a thin film for decoration on a region formed of the material that becomes sticky.

15. A shaping method for shaping a shaped object which is stereoscopic, and the shaping method comprising:
generating a decorated shaped object data, which is data indicating the shaped object on which decoration indicated by a decoration data has been applied, based on at least a three-dimensional data, which is data indicating a stereoscopic shape of the shaped object, and the decoration data, which is data indicating decoration to be applied on at least a part of a surface of the shaped object; and
causing a shaping device to execute a shaping operation of the shaped object based on the decorated shaped object data to shape the shaped object on which decoration indicated by the decoration data has been applied,
wherein the decoration data indicates that at least a part of the surface of the shaped object is formed to a frosted state,
wherein the shaping device comprises an inkjet head that ejects a material of the shaped object,
the inkjet head ejects a material for shaping to a position set according to a resolution of shaping to form a dot of the material corresponding to a voxel, which is a minimum unit of shaping,
a decoration portion, that is decorated by the decoration data, is formed by a collection of a plurality of the voxels,
the decoration data is data indicating to form at least a part of the surface of the decoration portion into a matte state, and
in the step of generating the decorated shaped object data, the decorated shaped object data that is generated indicates the shaped object in which a matte region formed into a matte state by decimating parts of the voxels of the surface of the decoration portion is formed in at least a part of the surface of the decoration portion based on the decoration data and the three-dimensional data,
wherein an ink dot, that is a material of a support layer to be removed upon completion of the shaping, is disposed at a location at which the voxel is not decimated.

16. The shaping system as set forth in claim 1, wherein decimating parts of the voxels is defined as ink dots being formed only at positions of some voxels, and not forming ink dots at positions of some voxels so as to be a discontinuous layer.

* * * * *